United States Patent
Kawamoto et al.

(10) Patent No.: US 10,183,216 B2
(45) Date of Patent: *Jan. 22, 2019

(54) GAME APPARATUS, STORAGE MEDIUM, GAME CONTROLLING METHOD AND GAME SYSTEM

(71) Applicant: Nintendo Co., Ltd., Kyoto (JP)

(72) Inventors: Kouichi Kawamoto, Kyoto (JP); Kanako Tsugihashi, Kyoto (JP); Ryutaro Takahashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,902

(22) Filed: May 22, 2017

(65) Prior Publication Data
US 2017/0252640 A1  Sep. 7, 2017

Related U.S. Application Data

(63) Continuation of application No. 14/879,278, filed on Oct. 9, 2015, now Pat. No. 9,687,733, which is a (Continued)

(30) Foreign Application Priority Data

Feb. 23, 2011 (JP) .................. 2011-036681

(51) Int. Cl.
*A63F 9/24* (2006.01)
*A63F 13/00* (2014.01)
(Continued)

(52) U.S. Cl.
CPC ............ *A63F 13/211* (2014.09); *A63F 13/06* (2013.01); *A63F 13/10* (2013.01); *A63F 13/213* (2014.09);
(Continued)

(58) Field of Classification Search
None
See application file for complete search history.

(56) References Cited

U.S. PATENT DOCUMENTS 6,213,872 B1 * 4/2001 Harada .................. A63B 24/00
235/105
6,948,083 B2  9/2005 Eguchi et al.
(Continued)

FOREIGN PATENT DOCUMENTS

JP  08-103568  4/1996
JP  11-073093  3/1999
(Continued)

OTHER PUBLICATIONS

Nintendo, "Game Boy Advance SP," initial release Mar. 23, 2003, https://en.wikipedia.org/wiki/Game_Boy_Advance_SP.*
(Continued)

*Primary Examiner* — Kevin Y Kim
(74) *Attorney, Agent, or Firm* — Nixon & Vanderhye, P.C.

(57) ABSTRACT

A game apparatus includes a micon, and the micon measures step counts in correspondence with the magnitude of accelerations indicated by acceleration data from an acceleration sensor when a user carries the game apparatus in a sleep mode in which the apparatus is closed. The step counts are converted into earned coins. In each of a plurality of games executed by the game apparatus, by using the earned coins, a special item is purchased, playing in a special course is permitted, a hint is displayed, and a game is played in fast-forward.

24 Claims, 26 Drawing Sheets

Related U.S. Application Data continuation of application No. 13/177,011, filed on Jul. 6, 2011, now Pat. No. 9,199,167.

(51) Int. Cl.

| | |
|---|---|
| *G06F 17/00* | (2006.01) |
| *G06F 19/00* | (2018.01) |
| *A63F 13/211* | (2014.01) |
| *A63F 13/46* | (2014.01) |
| *A63F 13/20* | (2014.01) |
| *A63F 13/428* | (2014.01) |
| *A63F 13/40* | (2014.01) |
| *A63F 13/213* | (2014.01) |
| *A63F 13/493* | (2014.01) |
| *A63F 13/69* | (2014.01) |

(52) U.S. Cl.
CPC ............ *A63F 13/428* (2014.09); *A63F 13/46* (2014.09); *A63F 13/493* (2014.09); *A63F 13/69* (2014.09); *A63F 2300/105* (2013.01); *A63F 2300/204* (2013.01); *A63F 2300/609* (2013.01)

(56) References Cited

U.S. PATENT DOCUMENTS

| | | |
|---|---|---|
| 8,311,768 B2 | 11/2012 | Fukutome et al. |
| 2001/0007825 A1 | 7/2001 | Harada et al. |
| 2002/0116147 A1 | 8/2002 | Vock et al. |
| 2004/0180708 A1 | 9/2004 | Southard et al. |
| 2007/0011919 A1 | 1/2007 | Case |
| 2009/0264172 A1 | 10/2009 | Morimura et al. |
| 2012/0054297 A1 | 3/2012 | Konno et al. |

FOREIGN PATENT DOCUMENTS

| | | |
|---|---|---|
| JP | 2003-157129 | 5/2003 |
| JP | 2003-316905 | 11/2003 |
| JP | 2007-128209 | 5/2007 |
| JP | 2008-531076 | 8/2008 |
| JP | 2009-247652 | 10/2009 |
| JP | 2009-254539 | 11/2009 |
| JP | 2010-004170 | 1/2010 |
| JP | 2010-009328 | 1/2010 |
| JP | 2011-000309 | 1/2011 |
| WO | WO 2006/086487 A2 | 8/2006 |

OTHER PUBLICATIONS

Nintendo, "Pokémon Pikachu 2 GS," Oct. 16, 2000, https://bulbapedia.bulbagarden.net/wiki/Pok%C3%A9mon_Pikachu_2_GS.*

Nintendo, Pokémon Pikachu 2 GS, Oct. 16, 2000, https://www.nintendo.com/consumer/systems/other/pokemonpikachu2gs.jsp.*

Office Action in parent U.S. Appl. No. 13/177,011 dated Jun. 25, 2013.

Office Action in parent U.S. Appl. No. 13/177,011 dated Jan. 3, 2014.

Office Action in parent U.S. Appl. No. 13/177,011 dated Aug. 22, 2014.

"Game Boy Advance SP," Nintendo, Mar. 23, 2003, handheld device with Wiki page showing date of release, http://en.wikipedia.org/wikilGame_BoLAdvance_SP.

"Pokemon Pikachu 2 GS," Nintendo, Oct. 16, 2000, reference page showing date of release: http://bulbapedia.bulbagarden.net/wiki/Pok%C3%A9mon_Pikachu_2_GS, Nintendo reference page: http://www.nintendo.com/consumer/systems/other/pokemonpikachu2gs.jsp.

Office Action in parent U.S. Appl. No. 13/177,011 dated Jan. 22, 2015.

Notice of Allowance in parent U.S. Appl. No. 13/177,011 dated Jul. 21, 2015.

Office Action in related case U.S. Appl. No. 14/879,278 dated Jan. 23, 2017.

Notice of Allowance in related case U.S. Appl. No. 14/879,279 dated Mar. 14, 2017.

* cited by examiner

FIG. 2
(A) TOP VIEW (FOLDED STATE)
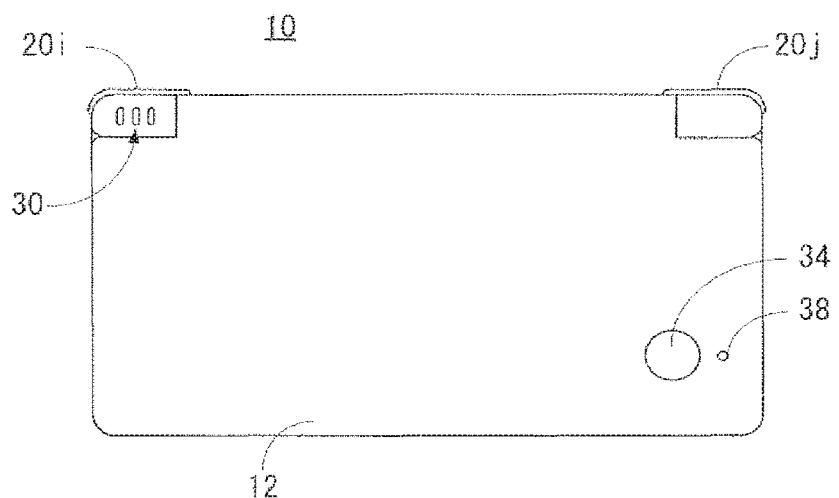
(B) SIDE SURFACE VIEW (FOLDED STATE)
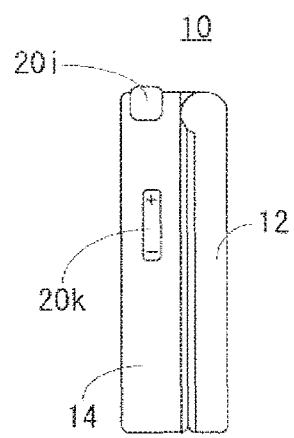

FIG. 4
(A) MAIN MANU SCREEN 200
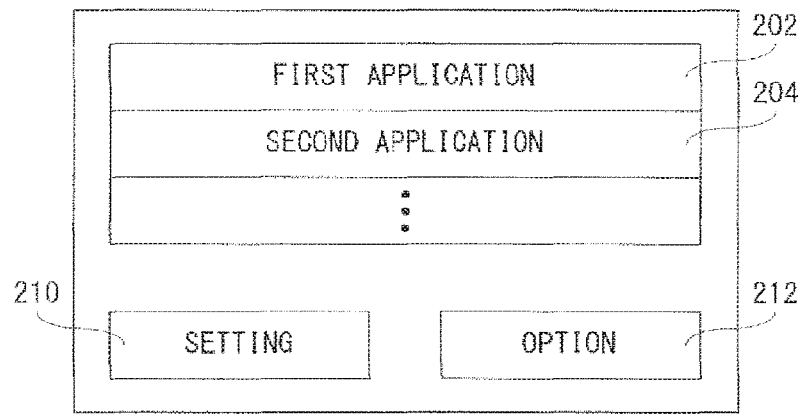
(B) ITEM PURCHASING SCREEN 300
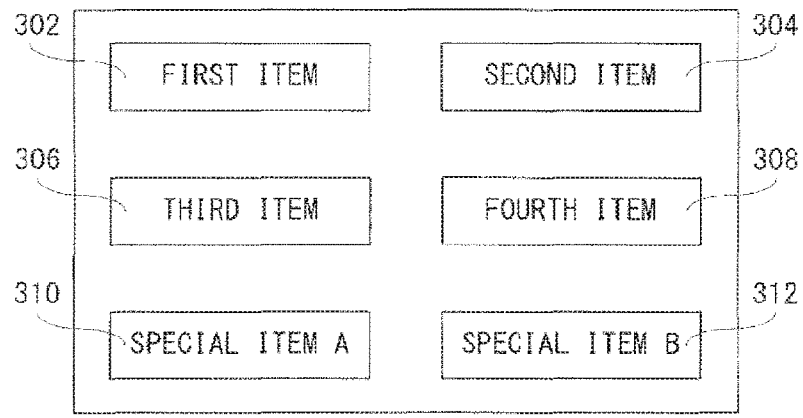
(C) COURSE SELECTING SCREEN 400
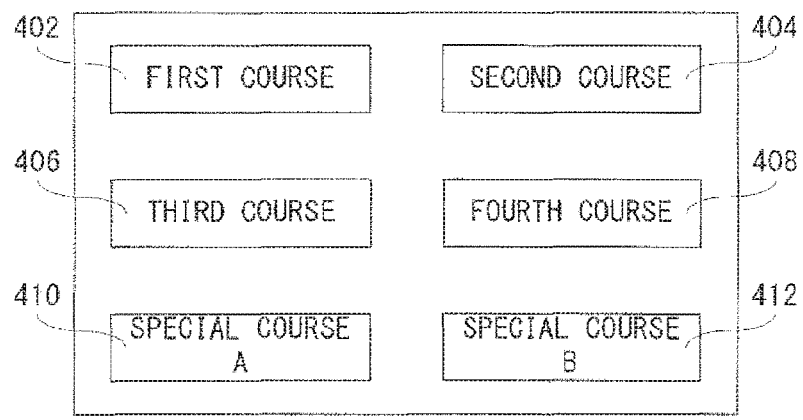

FIG. 20
(A) HINT DISPLAYING SCREEN 500
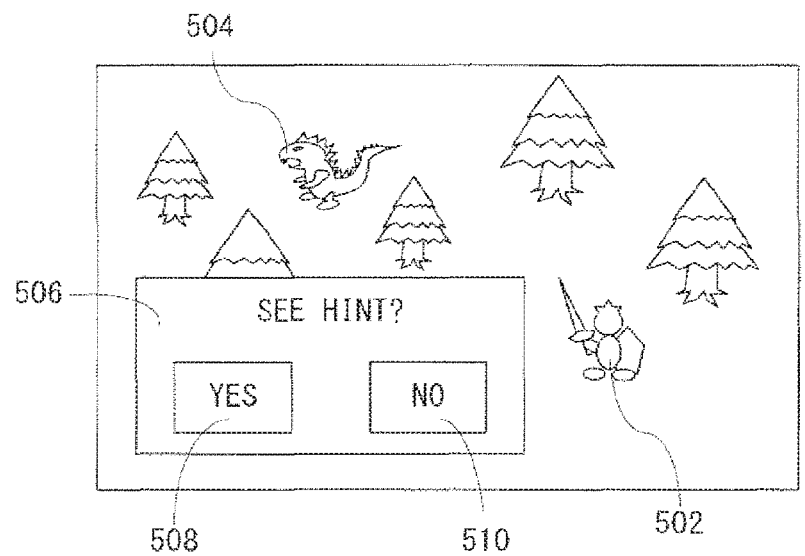
(B) GROWTH SCREEN 600
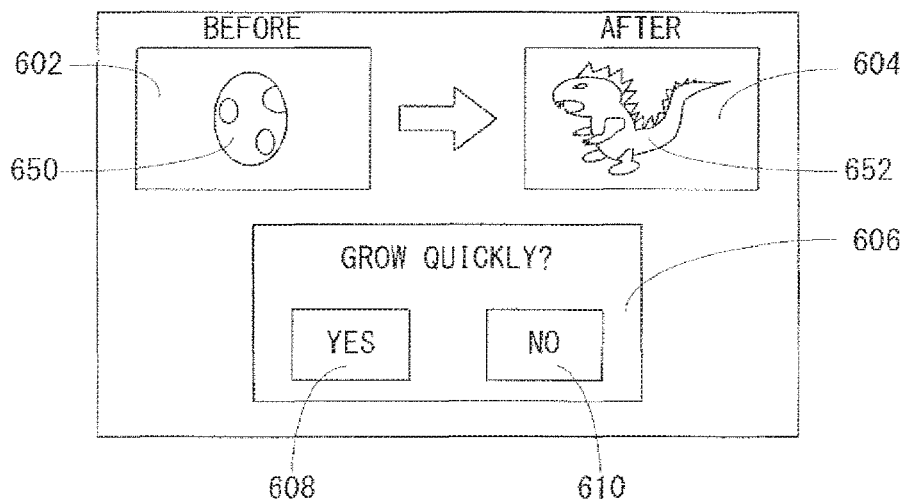

FIG. 21
(A)
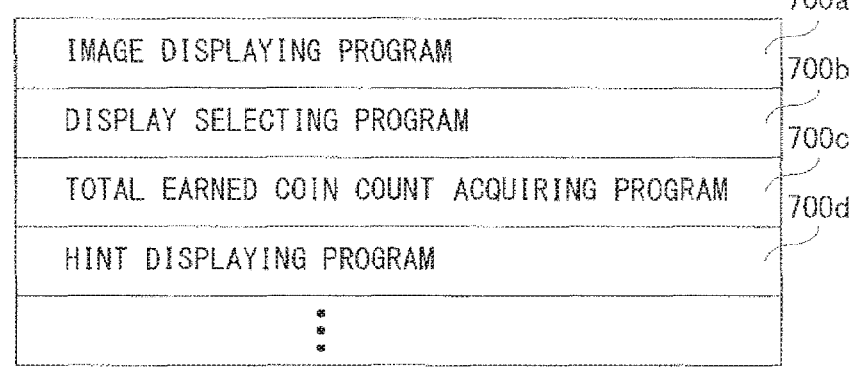
(B)
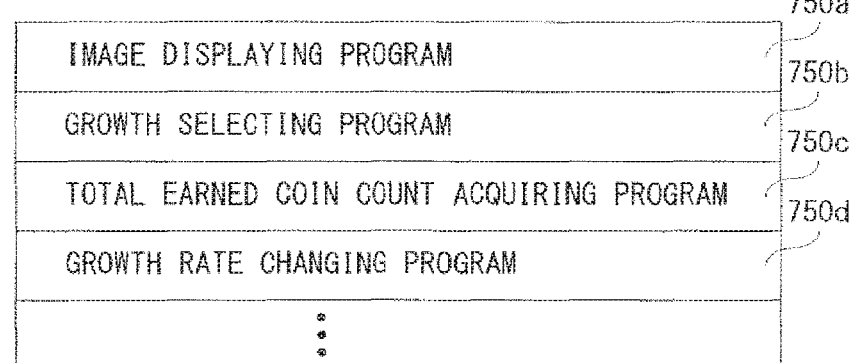

GAME APPARATUS, STORAGE MEDIUM, GAME CONTROLLING METHOD AND GAME SYSTEM

CROSS REFERENCE OF RELATED APPLICATIONS

This application is a continuation of U.S. patent application Ser. No. 14/879,278 filed Oct. 9, 2015, which is a continuation of U.S. patent application Ser. No. 13/177,011 filed Jul. 6, 2011 (now U.S. Pat. No. 9,199,167 issued Dec. 1, 2015), which claims priority to Japanese Patent Application No. 2011-36681 filed on Feb. 23, 2011, the entire contents of each are incorporated herein by reference.

BACKGROUND OF THE INVENTION

Field of the Invention

The present invention relates to a game apparatus, a storage medium, a game controlling method and a game system. More specifically, the present invention relates to a game apparatus, a storage medium, a game controlling method and a game system which advance a game according to an operation by a player.

Description of the Related Art

One example of a related art is disclosed in Japanese Patent Application Laying-Open No. 2003-316905 [G06F 17/60] (document 1) laid-open on Nov. 7, 2003. In a point system according to the document 1, step counts are converted into points, and depending on the number of points, a desired service can be selected from a plurality of services. More specifically, the user walks with an electric pedometer to thereby measure step counts, and when the electric pedometer is connected to a cellular phone, the measured step counts are transmitted to a WEB server from which points are given. The points thus given are accumulated, and the accumulated points are used for a discount for the fee of athletic club, a discount of costs for shopping and eating and drinking at the club, a discount of a specific site of the Internet, and a discount at general store.

Furthermore, another example of the related art is disclosed in Japanese Patent Application Laying-Open No. 2009-254539 [A63F 13/00] (document 2) laid-open on Nov. 5, 2009, in the game system of the document 2, by transmitting a plurality of step count data measured by a plurality of pedometers are transmitted to game apparatuses by wireless communications, various games by using the plurality of step count data can be executed among the game apparatuses. For example, a game whose content changes depending on the number of players walking at the same time and a game whose content changes depending on the sum of the step counts by the plurality of players are disclosed.

However, in the point system of the document 1, points accumulated in response to the step counts measured by the pedometer are used for discount of the services, and are not to be utilized in the game.

Also, in the game system of the document 2, by using the step counts measured by the pedometer, various games are executed, but using the step counts in the game is a premise.

SUMMARY OF THE INVENTION

Therefore, it is a primary object of the present Invention to provide a novel game apparatus, a novel storage medium, a novel game controlling method, and a novel game system.

Another object of the present invention is to provide a game apparatus, a storage medium, a game controlling method, and a game system capable of utilizing step counts for supporting advancement of a game.

A first invention is a game apparatus having an inputter, comprising a step count measurer, a game processor, and a utilizer. The step count measurer measures step counts. The game processor advances a game on the basis of an input from the inputter. The utilizer utilizes the step counts measured by the step count measurer in the game. The game processor executes processing of supporting advancement of the game when the step counts are utilized by the utilizer.

According to the first invention, by utilizing the step counts, the advancement of the game is supported, and thus, even a user who is bad at games, for example, can easily advance the game by walking, capable of widening the range of users.

A second invention is according to the first invention, wherein the utilizer utilizes the step counts in the game on the basis of an input from the inputter. The game processor executes game processing for advancing the game on the basis of an input from the inputter when the step counts are not utilized by the utilizer, and executes support processing for supporting advancement of the game in addition to the game processing when the step counts are utilized by the utilizer.

According to the second invention, even without utilizing the step counts, the game can be advanced, and by utilizing step counts, the support processing for supporting the advancement of the game can be performed, and therefore, it is possible for the user to select whether to utilize the step counts depending on the master of the game by the user. Accordingly, players from beginners to advanced players can enjoy playing the game without discrimination, capable of widening the range of users.

A third invention is according to the first invention, wherein the game processor outputs information being a hint for advancement of the game when the step counts are utilized by the utilizer. For example, a way and a clue to defeating of the enemy are presented, and a direction in which the player character should proceed is presented.

According to the third invention, by utilizing the step counts, a hint can be acquired, and therefore, even the game with a high difficulty level can easily be advanced by walking.

A fourth invention is according to the first invention, wherein the game processor executes processing of shortening a time required for advancing the game when the step counts are utilized by the utilizer. For example, the game is played in fast-forward. Accordingly, the growth rate of the character is heightened, and the time taken to raise the level is shortened.

According to the fourth invention, by utilizing the step counts, the game can be advanced fast, and therefore, it is possible to efficiently play the game by walking.

A fifth invention is according to the first invention, and the game apparatus further comprises an accumulator which converts the step counts measured by the step count measurer into a step count correlation value correlating with the step counts and accumulates the same. The utilizer utilizes the step count correlation value accumulated by the accumulator in the game.

According to the fifth invention, the step counts are converted into a step count correlation value, and the step count correlation value is accumulated, and therefore, it is possible to utilize the step counts thereafter for the purpose of supporting the advancement of the game.

A sixth invention is according to the fifth invention, wherein the utilizer utilizes the step count correlation value in the game in a case that the step count correlation value is equal to or more than a predetermined value, and further comprising: a subtracter which performs a subtraction on the step count correlation value when the step count correlation value is utilized by the utilizer in the game.

According to the sixth invention, in a case that the step count correlation value is equal to or more than the predetermined value, the step count correlation value can be utilized in the game, and therefore, unless the user walks a predetermined distance or longer, the support for advancing the game cannot be acquired, and therefore, it is possible to motivate the user to walk. Also, every time that the advancement of the game is performed, the step count correlation value is reduced, and therefore, it is possible to motivate the user to continuously walk.

A seventh invention, is according to the first invention, further comprising: a switcher which switches between an unused state and a used state of the game apparatus, and a switch determiner which determines whether or not the used state switches to the unused state. The step count measurer measures step counts when a shift to the unused state is determined by the switch determiner. That is, when the game apparatus is not in use, the step counts are measured.

According to the seventh invention, when the user or the player does not use the equipment, it can be used as a pedometer. Accordingly, even if the equipment is not in use, a motivation to carry it outside is given to the user.

An eighth invention is according to the seventh invention, wherein the switcher switches between a power saving mode and a normal mode. The switch determiner determines whether or not the used state shifts to the unused state by determining whether or not the normal mode shifts to the power saving mode.

In the eighth invention as well, when the user or the player does not use the equipment, it can be used as a pedometer.

A ninth invention is according to the seventh invention, further comprising a disabler which disables the game processor. The switcher switches from the used state to the unused state when the game processor is disabled by the disabler.

In the ninth invention as well, when the user or the player does not use the equipment, it can be used as a pedometer.

A tenth invention is according to the seventh invention, wherein a game apparatus body has an operable and closeable mechanism. For example, the cover of the apparatus is opened or closed, or the apparatus itself is opened and closed. The switcher switches between a closed state and an opened state of the game apparatus body. The switch determiner determines whether or not the used state shifts to the unused state by determining whether or not the game apparatus body shifts from the opened state to the closed state.

In the tenth invention as well, when the user or the player does not use the equipment, it can be used as a pedometer.

An eleventh invention is according to the first invention, further comprising: a communicator. The communicator automatically executes communication processing while step counts are measured by the step count measurer.

According to the eleventh invention, when the user or the player does not use the equipment, communication processing, such as transmission and reception of data, and transmission or reception of data is further automatically executed, it is possible to collect data from other apparatuses and access points, and transmit data to other apparatuses and access points. Also, since communication processing is automatically performed while step counts are measured, communications can be made with equipment carried by other users and players and access points set throughout the city without the user or the player knowing it while the user or the player carries the equipment outside. Accordingly, it is possible to give surprise and interest to the user and inspire the user to walk.

A twelfth invention is according to the eleventh invention, wherein the communicator automatically makes a search for another game apparatus, and automatically transmits and receives data with the other game apparatus when it is searched.

In the twelfth invention as well, similar to the eleventh invention, while the user or the player carries the equipment outside, communications with equipment carried by other users or players are made without he or she knowing it, and therefore, it is possible to give surprise and interest to the user and inspire the user to walk.

A thirteenth invention is according to the eleventh invention, wherein the communicator automatically makes a search for a predetermined access point, and automatically transmits and receives data via the access point when it is searched.

In the thirteenth invention as well, similar to the eleventh invention, while the user or the player carries the equipment, communications are automatically made via access points set throughout the city without he or she knowing it, and therefore, it is possible to give surprise and interest to the user and inspire the user to walk.

A fourteenth invention, is a game apparatus having an inputter, comprising a step count acquirer, a game processor, and a utilizer. The step count, acquirer acquires step counts. For example, the game apparatus acquires step counts measured by a pedometer separately provided. The game processor advances a game on tire basis of an input from the inputter. The utilizer utilizes the step counts acquired by the step count acquirer in the game. The game processor executes processing of supporting advancement of the game when the step counts are utilized by the utilizer.

A fifteenth invention is a storage medium storing a game program of a game apparatus having an inputter, wherein the game program causes the computer of the game apparatus to function as a step count measurer, a game processor, and a utilizer. The step count measurer measures step counts. The game processor advances a game on the basis of an input from the inputter. The utilizer utilizes the step counts measured by the step count measurer in the game. The game processor executes processing of supporting advancement of the game when the step counts are utilized by the utilizer.

A sixteenth invention is a storage medium storing a game program of a game apparatus having an inputter, and the game program causes the computer of the game apparatus to function as a step count acquirer, a game processor, and a utilizer. The step count acquirer acquires steps counts. The game processor advances a game on the basis of an input from the inputter. The utilizer utilizes the step counts acquired by the step count acquirer in the game. The game processor executes processing of supporting advancement of the game when the step counts are utilized by the utilizer.

A seventeenth invention is a game controlling method of a game apparatus having an inputter, comprising steps of: (a) measuring step counts; (b) advancing a game on the basis of the input from the inputter: and (c) utilizing the step counts measured by the step (a) in the game, wherein the step (b) executes processing of supporting advancement of the game when the step counts are utilized by the step (c).

An eighteenth invention is game controlling method of a game apparatus having an inputter, comprising steps of:(a) acquiring step counts; (b) advancing a game on the basis of the input from the inputter; and (c) utilizing the step counts acquired by the step (a) in the game, wherein the step (b) executes processing of supporting advancement of the game when the step counts are utilized by the step (c).

A nineteenth invention is a game system having an inputter, comprising a step count measurer, a game processor, and a utilizer. The step count measurer measures step counts. The game processor advances a game on the basis of an input from the inputter. The utilizer utilizes the step counts measured by the step count measurer in the game. The game processor executes processing of supporting advancement of the game when the step counts are utilized by the utilizer.

A twentieth invention is a game system including a game apparatus having an inputter and a pedometer measuring step counts, and the game apparatus comprises a step count acquirer, a game processor, and a utilizer. The step count acquirer acquires steps counts. The game processor advances a game on the basis of an input from the inputter. The utilizer utilizes the step counts acquired by the step count acquirer in the game. The game processor executes processing of supporting advancement of the game when the step counts are utilized by the utilizer.

In the fourteenth or twentieth invention as well, similar to the first invention, it is possible to widen the range of users.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a top and a left side surface of the game apparatus in a folded state shown in FIG. 1;

FIG. 4 is an illustrative view showing examples of screens to be displayed on a first LCD or a second LCD of the game apparatus shown in FIG. 1-FIG. 3;

FIG. 20 is art illustrative view showing another example of the screens to be displayed on the first LCD or the second LCD of the game apparatus shown in FIG. 1-FIG. 3;

FIG. 21 is an illustrative view showing another example of an application program stored in the data memory area of the main memory shown in FIG. 3;

DETAILED DESCRIPTION OF THE PREFERRED EMBODIMENTS

Figure 1:
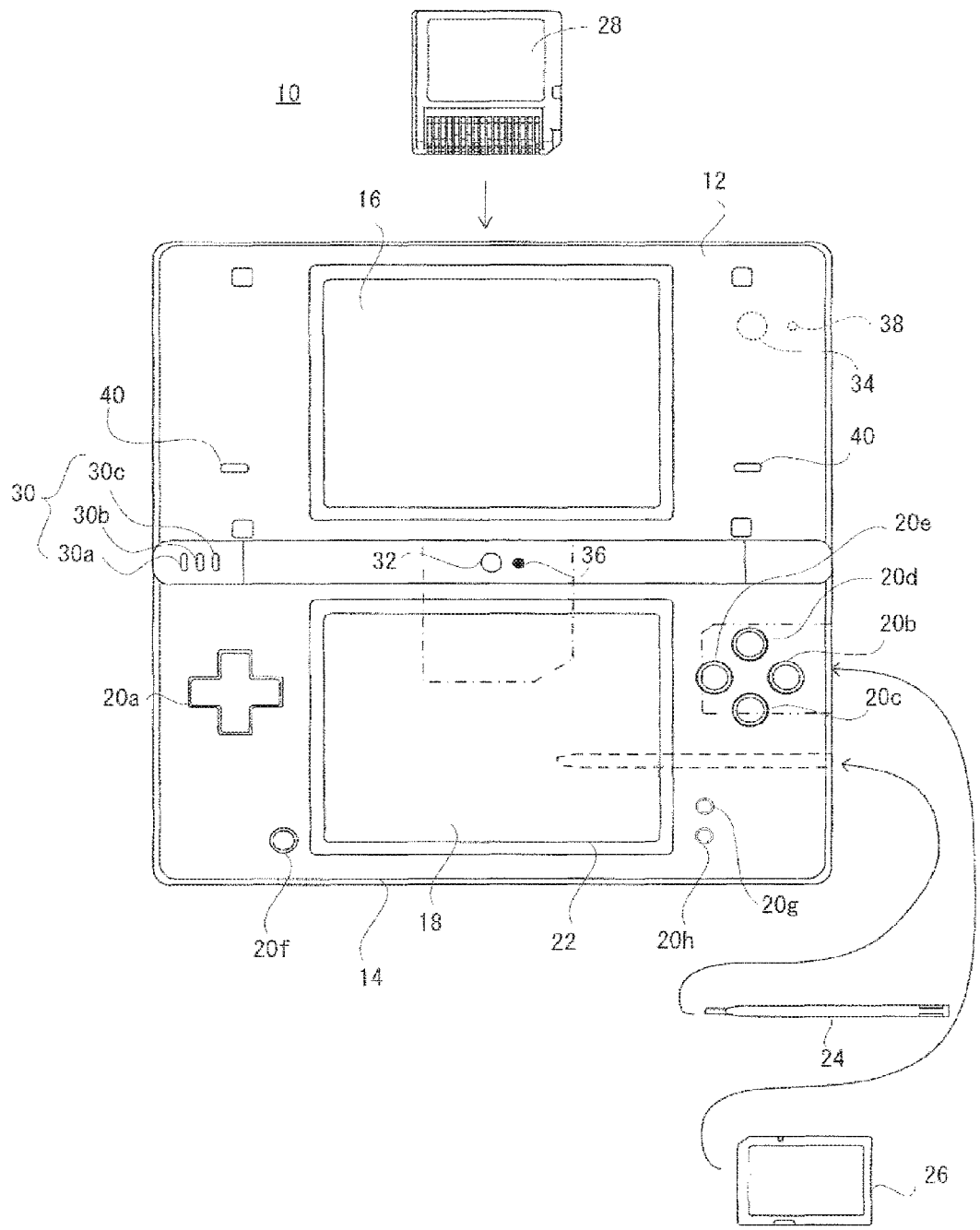
FIG. 1 is an illustrative view showing one embodiment of an external configuration of a game apparatus of this invention.

Referring to FIG. 1, a game apparatus 10 of an embodiment of the present invention includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding hand-held game apparatus, and in FIG. 1, the game apparatus 10 is shown in an opened state (in an open state). The game apparatus 10 is constructed such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at the arbitrary angle.

Additionally, the game apparatus 10 is mounted with a camera (32, 34) described later, functioning as an imaging device, such as imaging an image with the camera (32, 34), displaying the imaged image on the screen, and saving the imaged image data.

As shown in FIG. 1, the upper housing 12 is provided with a first LCD 36, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

As shown in FIG. 1 and FIG. 2, the lower housing 14 is provided with respective operation buttons 20a-20k as input devices. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for suspending (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided, at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in this embodiment, the L button 20i and the R button 20j can also be used for an operation of an imaging instruction (shutter operation). The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is further provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution, of the second LCD 18, for example, is utilized. However, the resolution of the touch panel 22 and the resolution of the second LCD 18 are not necessarily coincident with each other.

Additionally, at the right side surface of the lower housing 14, a loading slot (represented, by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot and the housing portion for the touch pen 24 need not be provided.

Moreover, on the right side surface of the lower housing 14, a loading slot for housing a memory card 26 (represented by a chain double-dashed line in FIG. 1) is provided. Inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot as well, a connector (not illustrated) for electrically connecting the game apparatus 10 and the memory card 28 is provided. The memory card 28 is a recording medium of recording an information processing program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another equipment, and the first LED 30a lights up when a wireless communication with the equipment, is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

Although illustration is omitted, a switch (opening and closing switch 42: see FIG. 3) that is switched, in response to opening and closing of the game apparatus 10 is provided inside the hinge. For example, the opening and closing switch 42 is turned on when that the game apparatus 10 is in an opened state. On the other hand, the opening and closing switch 42 is turned off when that the game apparatus 10 is in a closed (folded) state. Here, it is only necessary to know that the game apparatus 10 is in the opened state or the closed state, and therefore, turning on and off of the opening and closing switch 42 may be reversed.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the second LCD 18, an operation explanatory screen for teaching the user how the respective operation buttons 20a-20k and the touch panel 22 work or how to operate them, and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are opposite with each other. For example, the user holding the game apparatus 10 can image a landscape (including the user, for example) as the user is seen from the game apparatus 10 with the inward camera 32, and can image a landscape as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position for housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which, are constituted to image an image, and the first LCD 16 as a displayer for mainly displaying the imaged image and a game screen. On the other hand, the lower housing 14 is provided with the input device (operation button 20 (20a-20k) and the touch panel 22) for performing an operation input to the game apparatus 10 and the second LCD 18 as a displayer for mainly displaying an operation explanatory screen and a game screen. Accordingly, the game apparatus 10 has two screens (16, 18) and two kinds of operating portions (20, 22).

Figure 3:
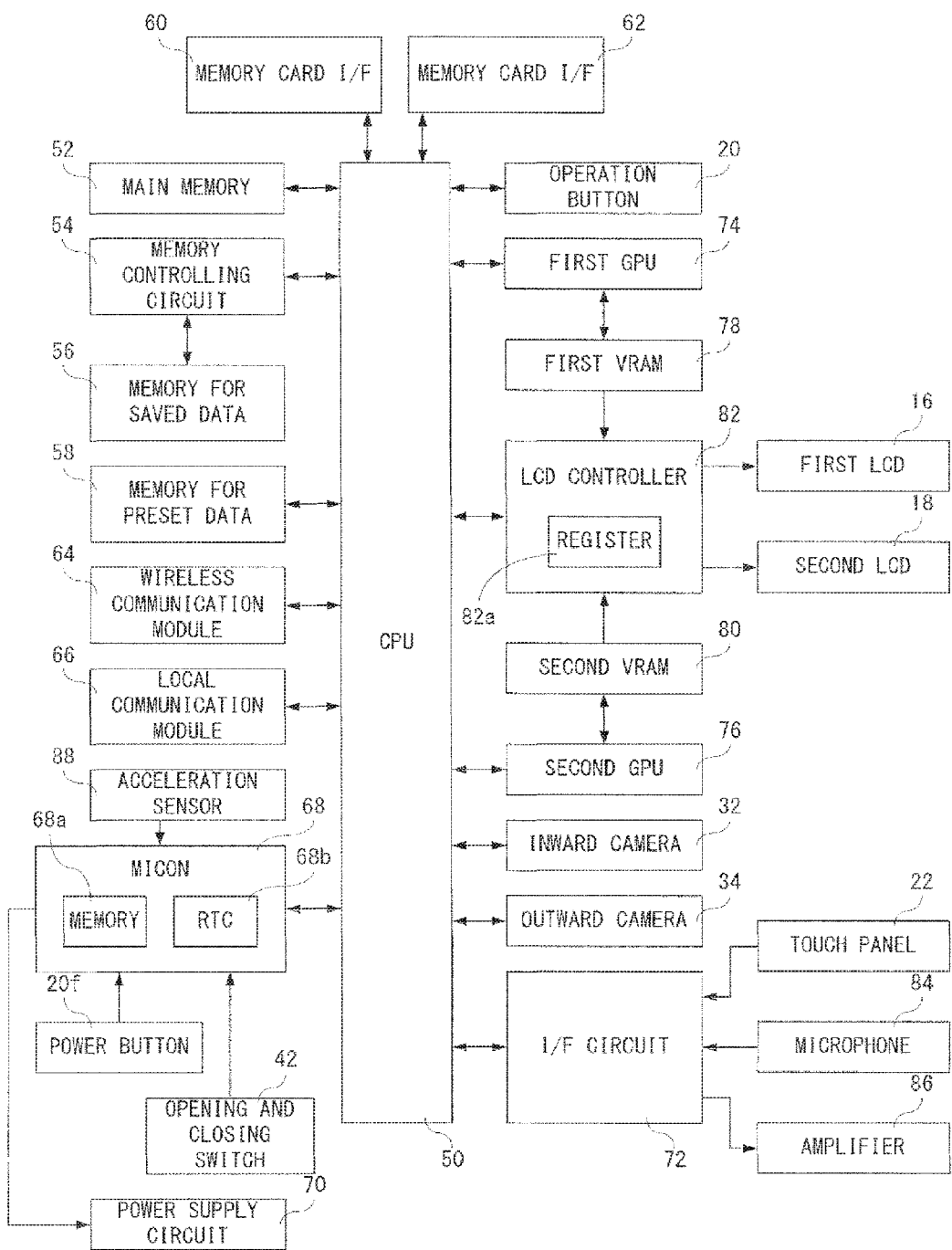
FIG. 3 is a block, diagram showing an electric configuration of the game apparatus shown in FIG. 1 and FIG. 2.

FIG. 3 is a block diagram showing an electric configuration of the game apparatus 10 of this embodiment. As shown in FIG. 3, the game apparatus 10 includes electronic components, such as a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a micon 68, a power supply circuit 70, an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing described later (game processing in this embodiment) by executing the predetermined program.

Here, the program to be executed by the CPU 50 may be previously stored in the memory within the game, apparatus 10, acquired from the memory card 26 and/or 28, and acquired from another appliance by communicating with the other equipment.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another equipment). In this embodiment, as a main memory 52, a PSRAM (Pseudo-SRAM) is used, for example. The memory for saved data 56 is a memory means for storing (saving) a program to be executed by the CPU 50, data of images imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 through an SPI (Serial Peripheral Interlace) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the images imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 are read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined, communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with the micon 68. The micon 68 includes a memory 68a and an RTC 68b. The memory 68a is a RAM, for example, and stores a program and data for a control by the silicon 68. The RTC 68b counts a lime. In the micon 68, date and a current time, etc, can be calculated on the basis of the time counted by the RTC 68b.

The micon 68 is connected with the power button 20f, the opening and closing switch 42, the power supply circuit 70, and the acceleration sensor 88. A power-on signal is given to the micon 68 from the power button 20f. When the power button 20f is turned on in a state that the main power supply of the game apparatus 10 is turned off, the memory 68a functioning as a BootROM of the micon 68 is activated to perform a power control in response to opening and closing of the game apparatus 10 as described later. On the other hand, when the power button 2f is turned on in a state that the main power supply of the game apparatus 10 is turned on, the micon 68 instructs the power supply circuit 70 to stop supplying power to all the circuit components (except for the micon 68). Here, the power supply circuit 70 controls the power supplied from the power supply (typically, a battery housed in the lower housing 14) of the game apparatus 10 to supply power to the respective circuit components of the game apparatus 10.

Furthermore, from an opening and closing switch 42, a power-on signal or a power-off signal is applied to the micon 68. In a case that the main power supply of the game apparatus 10 is turned on in a state that the opening and closing switch 42 is turned on (the main, body of the game apparatus 10 is in an opened state), a mode in which a power is supplied from the power supply circuit 70 to all the circuit components of the game apparatus 10 under the control of the micon 68 (hereinafter referred to as "normal mode") is set. In the normal mode, the game apparatus 10 can execute an arbitrary application and is in use by a user or a player (used state).

Furthermore, in a case that the opening and closing switch 42 is turned off in a state that the power supply of the game apparatus 10 is turned on (the main body of the game apparatus 10 is in a closed state), a mode in which, a power is supplied from the power supply circuit 70 to a part of the components of the game apparatus 10 (hereinafter referred to as "sleep mode") is set. However, depending on the kind of the applications and executing (progressing) situation of the applications, the sleep mode may not be set. Whether the sleep is executed or not is determined by the CPU 50, and when execution of the sleep is determined, the CPU 50 instructs the micon 68 to execute sleep. Here, in a case that the opening and closing switch 42 is turned off, when it is determined that the sleep mode cannot be set, a power supply from the power supply circuit 70 to the first LCD 16 and the second LCD 18 are suspended according to an instruction from the micon 68.

In the sleep mode, the game apparatus 10 cannot execute ail arbitrary application and is not in use (unused state) by the user. In this embodiment, the part of the components is the CPU 50, the wireless communication module 64, and the micon 68. Here, in the sleep mode (sleep state), the CPU 50 basically sets a clock in a stopped (inactivated) state, resulting in less power consumption. Additionally, in the sleep mode, a power supply to the CPU 50 may be stopped. Accordingly, in this embodiment, in the sleep mode, an application Is never executed by the CPU 50 as described above.

It should be noted that in a case that a communication is executed by the wireless communication module 64 in the sleep state, the CPU 50 is activated by a control signal from the wireless communication module 64. That is, by the wireless communication module 64, the clock of the CPU 50 is operated, and then, the wireless communication module 64 instructs the CPU 50 to start a communication. This holds true hereunder. Then, the CPU 50 instructs the micon 68 to start supplying power to the memory controlling circuit 54 and the memory for saved data 56. Accordingly, it is possible to transmit data stored in the memory for saved data 56 to another game apparatus 10, etc, and store data received from another game apparatus 10, etc. in the memory for saved data 56, by a communication.

Furthermore, in a case that step count data (accumulative step count data 152c described later) is output from the micon 68 in the sleep state, the CPU 50 is activated by a control signal from the micon 68. That is, the clock of the CPU 50 is activated by the micon 68 to notify the output of the step count data. Furthermore, the micon 68 controls the power supply circuit 70 to start supplying electric power to the memory controlling circuit 54 and the memory for saved data 56. Accordingly, the step data output from the micon 68 is stored in the memory for saved data 56.

In addition, when the sleep state is canceled (non-sleep state) due to the game apparatus 10 being opened, and so forth, a power-off signal is input to the micon 68 from the opening and closing switch 42. Thus, the micon 68 activates the CPU 50 to notify the CPU 50 of the cancelation of the sleep state. In response thereto, the CPU 50 instructs the micon 68 to cancel the sleep state. That is, under the instruction from the CPU 50, the micon 68 controls the power supply circuit 70 to start supplying electric power to all the circuit components. Thus, the game apparatus 10 shifts to the normal mode to enter the used state. Here, in a case that the sleep mode is not set, when the game apparatus 10 is opened, under the instruction from the CPU 50, the micon 68 supplies electric power to the first LCD 16 and the second LCD 18 by controlling the power supply circuit 70.

Moreover, as described above, the micon 68 is connected with the acceleration sensor 88. For example, the acceleration sensor 88 is a three-axis acceleration sensor, and provided inside the lower housing 14 (the upper housing 12 may be possible). This detects an acceleration in a direction vertical to the surface of the first LCD 16 (second LCD 18) of the game apparatus 10, and accelerations in two crosswise directions (longitudinal and laterally) that are parallel to the first LCD 16 (second LCD 18). The acceleration sensor 88 outputs a signal as to the detected acceleration (acceleration signal) to the micon 68. The micon 68 can detect a direction of the game apparatus 10, and a magnitude of the shake of the game apparatus 10 on the basis of the acceleration signal. Accordingly, it is possible to make the micon 68 and the acceleration sensor 88 function as a pedometer, for example. The pedometer using the acceleration sensor 88 is already known, and therefore, the detailed content is omitted, but the step counts are measured in correspondence with die magnitude of the acceleration.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position, data in a predetermined format on the basis of a signal from the touch panel 22 and outputs the same to the CPU 50. For example, the touch position data is data indicating coordinates of a position where an input is performed on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where an input is made.

The operation button 20 is made up of the aforementioned respective operation buttons 20*a*-20*k* (except for the power switch 22*f*. This hold true for the following), and is connected to the CPU 50. The operation data indicating an input state (whether or not to be pushed) with respect to each of the operation buttons 20*a*-20*k* is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to instructions from the CPU 50, and output Image data corresponding to the imaged images to the CPU 50. In this embodiment, the CPU 50 issues an imaging instruction to any one of the inward camera 32 and the outward camera 34 while the camera (32, 34) which has received the imaging instruction images an image and transmits the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78. The second GPU 76 similarly generates a second display image according to an instruction form the CPU 50, and draws the same in the second VRAM 80. The first VRAM 78 and the second VRAM 80 are connected to the LCD controller 82.

The LCD controller 82 includes a register 82*a*. The register 82*a* stores a value of "0" or "1" according to an instruction from the CPU 50. In a case that the value of the register 82*a* is "0", the LCD controller 82 outputs the first display image drawn in the first VRAM 78 to the second LCD 18, and outputs the second display image drawn in the second VRAM 80 to the first LCD 16. Furthermore, in a case that the value of the register 82*a* is "1", the LCD controller 82 outputs the first display image drawn in the first VRAM 78 to the first LCD 16, and outputs the second display image drawn in the second VRAM 80 to the second LCD 18.

For example, such a game apparatus 10 executes in-passing (StreetPass) communication processing or unconscious (SpotPass) communication processing in the unused state (or when being set to a sleep mode). Here, the in-passing communication processing is briefly explained, in the sleep mode, the wireless communication module 64 automatically transmits (broadcasts) a signal (connection request signal, beacon) indicating a connection request to other game apparatuses 10 regarding a predetermined time (30 ms, for example) as a search period during the search period, and tries to receive a connection request signal from other game apparatuses 10. The search period is repetitively set. That is, in-passing communication processing is automatically intermittently executed. Thus, other game apparatuses 10 in coverage of the short distance wireless communication are searched (sought, scanned). Here, the connection request signal includes identifying information of the game apparatus 10 being a transmission source.

At this time, when receiving the connection request signal, the game apparatus 10 transmits a connection admission signal to the game apparatus 10 being a transmission source of the connection request signal in response thereto. Here, the connection admission signal includes identifying information of the game apparatus 10 being a transmission source. This makes it possible to confirm each, other's existences between the two game apparatuses 10 to thereby establish, a connection or a communication state between them.

Here, in the game apparatus 10 that transmits the connection admission signal in response to the connection request signal, the wireless communication module 64 activates the CPU 50 to start supplying electric power from the power supply circuit 70 to the memory controlling circuit 54 and the memory for saved data 56 under the control of the micon 68 according to an instruction from the CPU 50. Similarly, in the game apparatus 10 which receives the connection admission signal, the wireless communication module 64 activates the CPU 50 to start supplying electric power from the power supply circuit 70 to the memory controlling circuit 54 and the memory for saved data 56 under the control of the micon 68 according to an instruction from the CPU 50.

When a communication state is established, data set (decided) in advance, such as game data, message data, etc, is transmitted or received, or transmitted and received, between the two game apparatuses 10.

Although the detailed description is omitted, when the in-passing communication is ended (when data transmission and data reception in relation to the in-passing communication are completed), each game apparatus 10 returns to the sleep state.

Also, the detailed description is omitted, in a case that in-passing communication is executed, out of the two game apparatuses 10 that establish the connection state, the game apparatus 10 that transmits a connection request signal functions as a parent machine, and the game apparatus 10 that transmits a connection admission signal in response to the connection request signal functions as a child machine.

Accordingly, when the user or the player carries the game apparatus 10 in the unused state (or, sleep state), a communication (in-passing communication) is automatically made with other game apparatuses 10 without any operation to thereby acquire data, such as game data, message data, etc. from the other game apparatus 10.

Next, the unconscious communication processing is simply explained. The unconscious communication is to automatically connect to a predetermined server via a predetermined access point, and automatically make communication processing with this server. The wireless communication module 64 regards a period other than the search period for in-passing communication as a search period for unconscious communication, and tries to receive a beacon from the predetermined access point within the search period for the unconscious communication. The unconscious search period is repetitively set at regular lime intervals. That is, the unconscious communication processing is executed automatically intermittently. Thus, predetermined access points in coverage of the short distance wireless communication are searched. Here, the beacon includes identification information of the access point.

At this time, when the game apparatus 10 receives a beacon from the predetermined access point, it automatically connects to this access point, and further automatically connects to the predetermined server via this access point.

Here, in the game apparatus 10 receiving the beacon, the wireless communication module 64 activates the CPU 50 to start supplying power from the power supply circuit 70 to the memory controlling circuit 54 and the memory for saved data 56 under the control of the micon 68 according to an instruction from the CPU 50.

When a connection with the server is established, game data, message data, etc. are transmitted from the server, and these data are received via the predetermined access point.

Although the detailed explanation is omitted, when the unconscious communication is ended (or data transmission and data reception in relation to the unconscious communication are completed), each game apparatus 10 returns to the sleep state.

Accordingly, when the user or the player carries the game apparatus 10 in the unused state (or, sleep state), communications (unconscious communication) are automatically made with the predetermined access point and the predetermined server without any operation to thereby acquire game data, message data, etc. from this server via this access point.

Furthermore, as described above, in the sleep mode, the game apparatus 10 functions as a pedometer, and in a case that the user or the player walks with the game apparatus 10, the number of step counts of the user or the player is counted. The counted step count is reflected on the processing of application programs to be executed in the game apparatus 10 as necessary.

For example, in the memory for saved data 56 shown in FIG. 3, application programs as to a plurality of applications can be stored. When the main power supply of the game apparatus 10 is turned on, a main menu screen 200 for selecting an application, etc. as shown in FIG. 4(A) is displayed on the second LCD 18 (first LCD 16 may be possible).

Here, although the detailed description is omitted, in a case that each application is ended as well, the main menu, screen 200 is displayed.

As shown in FIG. 4(A), on the main menu screen 200, a plurality of button images 202, 204, . . . for selecting an application are provided, and below it, button images 210, 212 for selecting various settings and options are provided. The user or the player turns on the button images 202, 204, . . . to thereby select a desired application.

When the button image 202 is turned on, for example, a first application is selected. In a situation in which an item is purchased during the game according to a program (first application program) of the first application, a screen (item purchasing screen) 300 as shown in FIG. 4(B) is displayed on the second LCD 18 (even the first LCD 16 may be possible).

On the item purchasing screen 300, button images 302, 304, 306, 308, 310, 312 are displayed. For example, the button images 302 to 308 are provided for selecting an item (normal item; the first to fourth items) which the player (user) or the player character can purchase by using coins (hereinafter referred to as "normal coin") acquired in the game. Furthermore, the button image 310 and the button image 312 are provided for selecting an item (special items A, B) by using the coin (hereinafter referred to as "earned coin") earned depending on the measured step counts.

Here, the normal coins are coins which are arranged within the game space, are given as a reward for labor or training in the game, or are given in correspondence with a victory in the battle game, etc., and are acquired by the player or the player character in the game as described above. Also, the earned coins are coins earned by converting the measured step counts measured by the game apparatus 10 carried by the player, and cannot be acquired in the game.

Although the detailed description is omitted, the number of normal coins required to purchase the first to fourth items and the number of earned coins required to purchase the special items A, B are decided in advance. Naturally, in a case that the player (user) or the player character does not have the normal coins or the earned coins being equal to or more than the required number of normal coins or the required number of earned coins, he or she cannot purchase the first to fourth items or the special items A, B.

That is, the normal item is purchased and used to thereby advance the game, and the special item is purchased and used to thereby advance the game. Also, in a case that the purchased special item (purchased special item) is a tool, for example, the player character can use the tool. For example, by using the purchased item, the ability of the player character 102 is changed, to thereby support the advance of the game. In such a case, the player characters 102 is increased in the remaining number, restored in the physical strength, is heightened in the attack power for a certain period of time, is made invincible, for a certain period of time, or has more friends, for example. Moreover, if the number of attacks is restricted, the number of attacks is increased.

Furthermore, when the button image 204 is turned on on the main menu screen 200 shown in FIG. 4(A), the second application is selected. For example, at a start (restart) of the game according to the program of the second application (second application program), in the situation in which a course is selected, a screen (course selecting screen) 400 as shown in FIG. 4(C) is displayed on the second LCD 18 (the first LCD 16 may be possible).

On the course selecting screen 400, button images 402, 404, 406, 408, 410, 412 are displayed. For example, the button images 402 to 408 are provided for selecting the course (normal course: the first to fourth courses) capable of selecting without using the earned coins. Furthermore, the button image 410 and the button image 412 are provided for selecting the course (special course A, B) capable of playing with the use of the earned coins.

Although the detailed description is omitted, the number of earned coins required to play on the special courses A, B is decided in advance. Naturally, in a case that the player (user) or the player character does not have the required number of earned coins or more, he or she cannot play the game on the special course A, B.

Here, if a playable state on the special course A, B is established, by using the earned coin once, the game may be playable without limitation, or the playable number and the playable period may be set.

Thus, the normal course is selected to thereby play the normal course, and the special courses A, B are selected to thereby play in the special courses A, B. For example, the special courses A, B are courses for training game technique and courses at level higher in the difficulty level than the normal course. That is, the special courses A, B are secondarily courses playable in accordance with walking by the player.

The earned coin acquired by converting the step counts can thus commonly be used in the processing of a plurality of different applications programs. Here, for simplicity, the explanation is made when the earned coins are used in the processing of the two application programs, but the earned coins can be used in the processing of the different three or more application programs. Here, the application programs need not be stored (installed) in the memory for saved data 56, may be read from the memory cards 26, 28 attached to the game apparatus 10, or may be downloaded from the external equipment.

Figure 5:
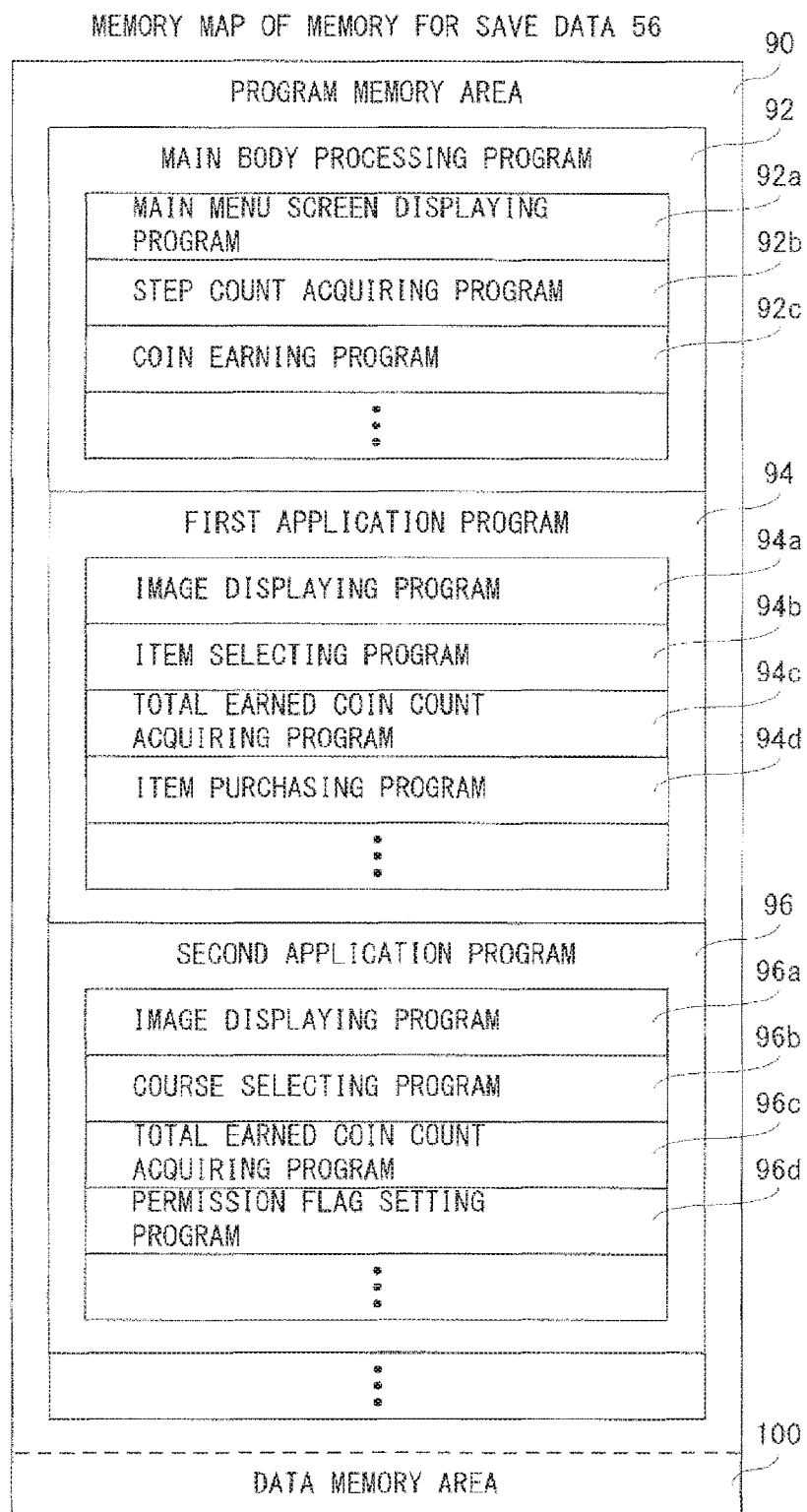
FIG. 5 is an illustrative view showing a memory map of a memory for saved data shown in FIG. 3.

FIG. 5 is an illustrative view showing a memory map of the memory for saved data 56 shown in FIG. 3. As shown in FIG. 5, the memory for saved data 56 includes a program memory area 90 and a data memory area 100. In the program memory area 90, a main body processing program 92, a first application program 94, a second application program 96, . . . are stored.

The main body processing program 92 is made up of a main menu screen displaying program 92*a*, a step count acquiring program 92*b*, a coin earning program 92*c*, etc.

The main menu screen displaying program 92*a* is a program for displaying the main menu screen 200 shown in FIG. 4(A) in a case that the main power supply of the game apparatus 10 is turned on or in a case that the processing of the application is ended.

The step count acquiring program 92*b* is a program for receiving data (step count data) as to step counts transmitted from the micon 68, and storing the same in the data memory area 100.

The coin earning program 92*c* is a program for converting step counts indicated by the step count data (1020, 1022, . . . , 102*m*) into earned coins. In this embodiment, conversion is made to the earned coins as a value correlated to step counts (correlation value), but there is no need of being restricted thereto, and conversion to other items or parameters may be possible.

Although illustration is omitted, in the main body processing program 92, sound outputting program, etc. is also stored. The sound outputting program is a program for outputting a sound (sound effect), and music (BGM).

The first application program 94 is made up of an image displaying program 94*a*, an item selecting program 94*b*, a total earned coin count acquiring program 94*c*, an item purchasing program 94*d*, etc.

The image displaying program 94*a* is a program for displaying a game image (game screen) on the first LCD 16 and the second LCD 18. More specifically, the image displaying program 94*a* is executed to generate a game image by using image data not shown (polygon data, texture data, etc.), and to output the same on the first LCD 16 and the second LCD 18. This holds true hereunder.

The item selecting program 94*b* is a program for determining whether or not an item is selected according to an instruction from the user or the player. More specifically, it is determined whether or not any button images 302-312 is turned on on the item selecting screen 300 shown in FIG. 4(B).

The total earned coin count acquiring program 94*c* is a program for acquiring a total number of earned coins (hereinafter referred to as "total earned coin count"). More specifically, total, earned coin count data 1028 included in the earned coin count data 102*b* stored in a shared, data memory area 102 described letter Is read.

The item purchasing program 94*d* is a program for purchasing the normal item (the first to fourth items) or the special item (special items A, B) by using the normal coin or the earned coin.

Although illustration is omitted, the first application program includes a main processing program, sound outputting program, a backup program, a various processing program, etc. The main processing program is a program for processing a main routine of the first application. The sound outputting program is a program for outputting a sound (sound effect) and music (BGM) associated with execution of the first application program. Furthermore, the backup program is a program for storing (saving) game data (proceeding data, end data) stored in the main memory 52 in the first application memory area 104 (see FIG. 6) of the memory for saved data 56 and the memory cards 26, 28 according to an instruction from the user or the player, or according to a predetermined event. The various processing program is a program for making the player character move or make an action according to an operation by the player, making the non-player character (enemy character, for example) move or make an action, calculating scores, determining game clear and game over, executing processing according to a game event, and executing game screen displaying (updating) processing. This holds true for other application programs including the second application program.

In addition, the second application program 96 is made up of an image displaying program 96a, a course selecting program 96b, a total earned coin count acquiring program 96c, a permission flag setting program 96d, etc.

The image displaying program 96a and the total earned coin count acquiring program 96c are the same as the above-described image displaying program 94a and, total earned coin count acquiring program 94c, and a redundant explanation therefor is omitted.

The course selecting program 96b is a program for determining whether or not any one of the button images 402 to 412 is turned on on the course selecting screen 400 as shown in FIG. 4(C) at a start (restart) of the game.

The permission flag setting program 96d is a program for setting a flag (permission flag) as to whether or not game playing is performed at the special course (special courses A, B).

Although illustration is omitted, the second application program 96 includes a main processing program, a sound outputting program, a backup program, a various processing program, etc.

Also, although omitted in FIG. 5, in the program memory area 90, other application programs are also stored.

Figure 6:
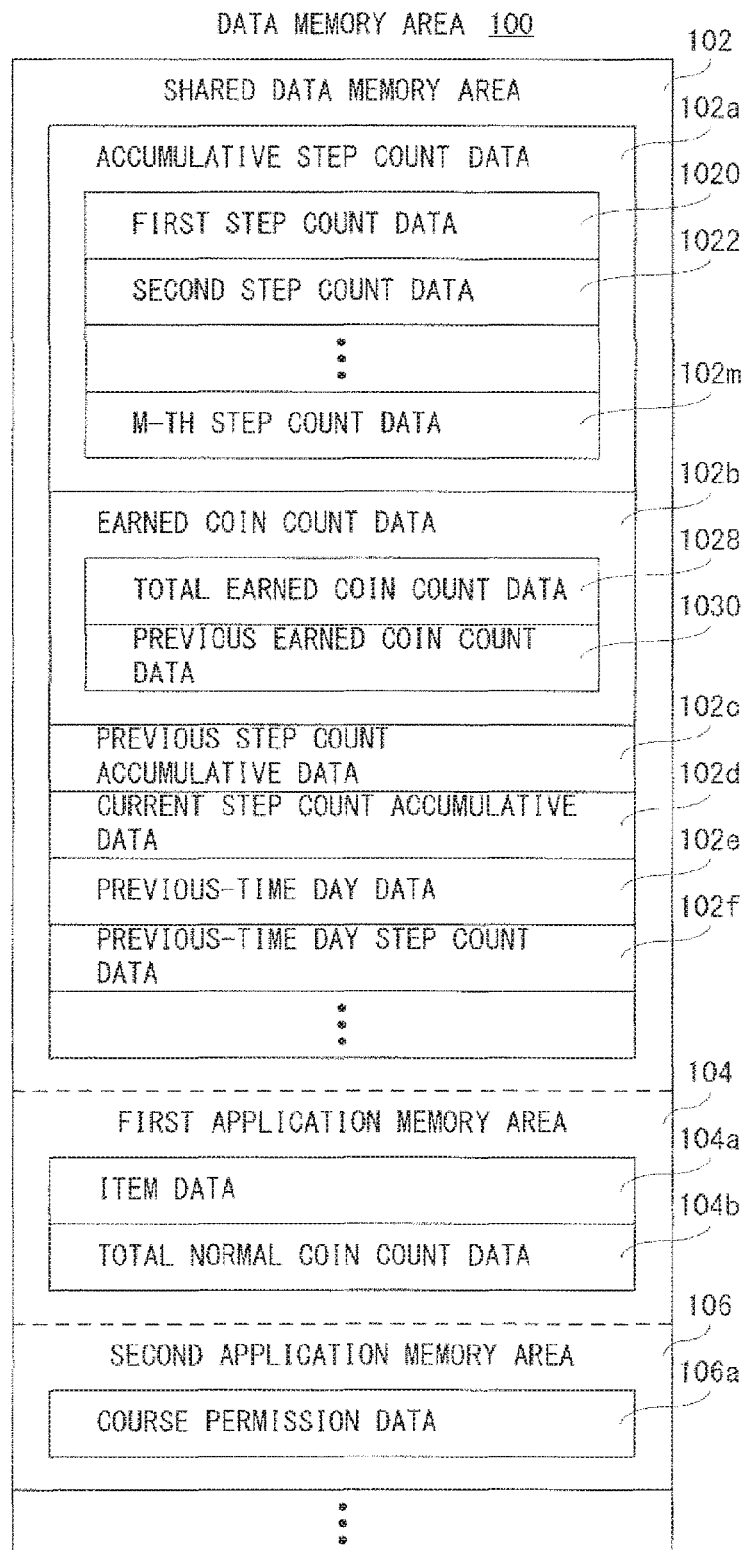
FIG. 6 is an illustrative view showing a detailed content of a data memory area shown in FIG. 5.

As shown in FIG. 6, the data memory area 100 of the memory for saved data 56 includes the shared data memory area 102, the first application memory area 104, a second application memory area 106, etc.

The shared data memory area 102 is an area accessible irrespective of the kind of an active application program. That is, this is an area capable of writing to and reading from even if either application is executed. In the shared data memory area 102, accumulative step count data 102a, earned coin count data 102b, previous step count accumulative data 102c, current step count accumulative data 102d, previous-time day data 102e, previous-time day step count data 102f, etc. are stored. The accumulative step count data 102a includes first step count data 1020, second step count data 1022, . . . , m-th step count data 102m. The step count data 1020-102m is data as to step counts acquired by the micon 68 every unit of time, and includes information about a time (date and time (hour, minute, second)) when the step counts are acquired. Here, the step count data (1020, 1022, . . . , 102m) is acquired from the micon 68 and stored in the data memory area 100 in a case that the main menu screen 200 is displayed on the second LCD 18 (or the first LCD 16) of the game apparatus 10.

The earned coin count data 102b includes the total, earned coin count data 1028 and previously earned coin count data 1030. The total earned coin count data 1028 is numerical value data as to a total earned coin count. The previously earned coin count data 1030 is numerical value data as to the number of earned coins when the step counts are previously converted into the earned coins.

The previous step count accumulative data 102c is numerical value data as to an accumulative amount of step counts until the step counts are previously converted into the earned coins. The current step count accumulative data 102d is numerical value data as to an accumulative amount of step counts until now. The previous-time day data 102e is data as to a date (year, month and day) when the step counts are previously converted into coins (change to coins). The previous-time day step count data 102f is numerical value data as to step counts before a change to coins is made out of the step counts at the date (year, month and day) when a change to coin is previously performed.

Furthermore, the first application memory area 104 is an area accessible only when the first application program 94 is executed. In the first application memory area 104, item data 104a and total normal coin count data 104b are stored.

Although illustration is omitted, the item data 104a is data indicating whether or not an item (normal item, special item) is acquired (possessed), and a flag is set by being brought into correspondence with each item. In a case that an "item" is simply referred, this means both of the normal item and the special item. In a case that the player (user) or the player character has (possesses) an item, the flag corresponding to the item is turned on. On the other hand, in a case that the player (user) or the player character does not have (possesses) an item, the flag corresponding to the item is turned off. Furthermore, the total normal coin count data 104b is numerical value data indicating a total number of normal coins possessed (had) by the player or the player character in the game. The total number of normal coins indicated by the total normal coin count data 104b is increased by being acquired by the player or the player character in the game, and decreased by being used by the player or the player character in the game.

Here, for simplicity, only two pieces of data like the item data 104a and the total normal coin count data 104b are described, but the game data including the item data 104a and the total normal coin count data 104b is actually stored.

In addition, the second application memory area 106 is an area accessible only when the second application program 96 is executed. In the second application memory area 106, course permission data 106a is stored. Although, illustration is omitted, the course permission data 106a is data of a permission flag as to whether or not playing on the special courses A, B is permitted. If playing on the special courses A, B is permitted, the flag corresponding to each of the special courses A, B is turned on. On the other hand, if playing on the special courses A, B is not permitted, the flag corresponding to each of the special courses A, B is turned off.

Here, only the course permission, data 106a is described for simplicity, but the game data including the course permission data 106a is actually stored.

Additionally, in the data memory area 100, a memory area for other applications is provided.

In addition, although detailed description is omitted, the main body processing program 92 and the application program (94, 96, . . . ) to be executed by the CPU 50 are read (loaded) into the main memory 52. Moreover, data generated or created during execution of the main body processing program 92 and the application program (94, 96, . . . ) is stored in the main memory 52, and stored (saved) in the memory for saved data 56 as necessary.

Figure 7:
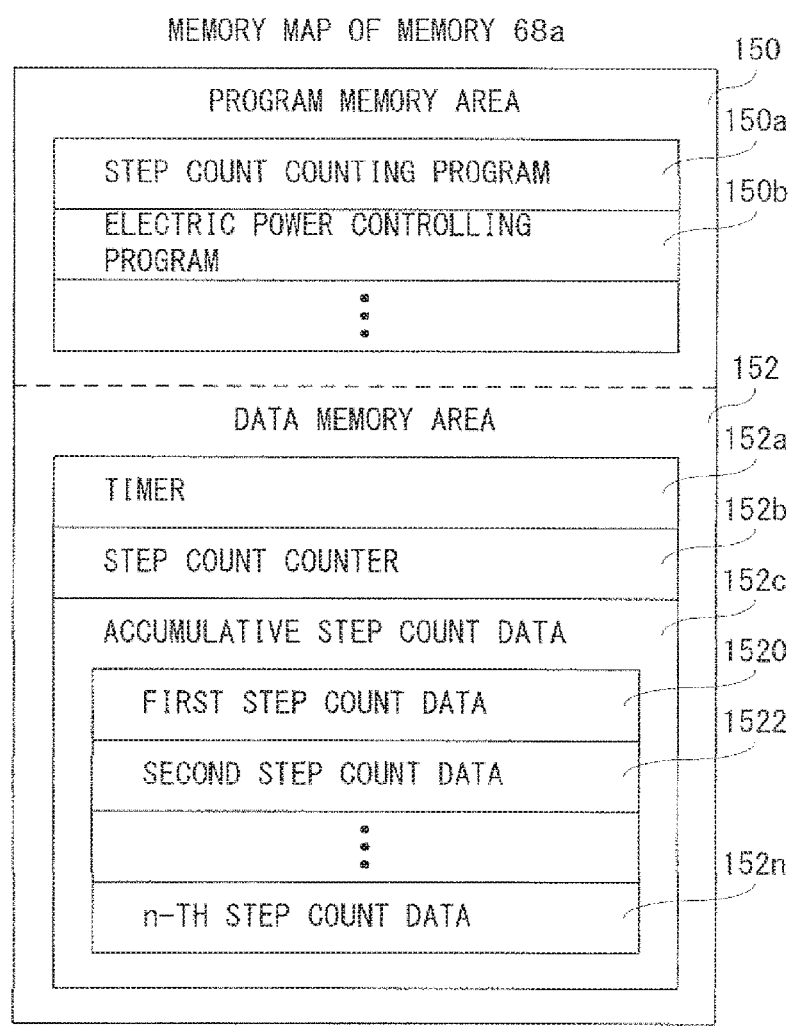
FIG. 7 is an illustrative view showing a memory map of a memory integrated in a micon shown in FIG. 3.

FIG. 7 is a memory map of the memory 68a provided to the micon 68. The memory 68a includes a program memory area 150 and a data memory area 152. In the program memory area 150, programs, such as a step count counting program 150a, an electric power controlling program 150b, etc, are stored.

The step count counting program 150a is a program, for counting step counts. In this embodiment, the step count counting program 150a is a program for counting step counts on the basis of a change amount of accelerations (three-axis accelerations) indicated by the acceleration data from the acceleration sensor 88. The electric power controlling program 150*b* is a program for instructing the CPU 50 to switch between the normal mode (non-sleep state) and the sleep mode (sleep state) in response to an on and an off signal from, the opening and closing switch 42, and controlling electric power supply from the power supply circuit 70 to each of the circuit components according to an instruction from the CPU 50. This makes it possible to switch between the used state and the unused state of the game apparatus 10.

Although illustration is omitted, in the program memory area 150*b*, other programs are also stored.

In the data memory area 132, a timer 152*a* and a step count counter 152*b* are provided. The timer 152*a* is a timer for counting a time from, the start of counting step counts. The step count counter 152*b* is an up counter for counting step counts.

Furthermore, in the data memory area 152, accumulative step count data 152*c* is stored. The accumulative step count data 152*c* includes first step count data 1520, second step count data 1522, . . . , n-th step count data 152*n*. Here, each step count data (1520, 1522, . . . , 152*n*) is data as to step counts per first unit of time (one hour in this embodiment). For example, the first step count data 1520, the second step count data 1522, . . . , the n-th step count data 152*n* are stored in this order. Additionally, in the sleep mode, the accumulative step count data 152*c* stored in the data memory area 152 per second unit of time (three hours in this embodiment) due to the relatively low capacity of the memory 68*a* is output to the CPU 50, and moved (saved) to the memory for saved data 56 via the memory controlling circuit 54. As explained in detail, the micon 68 operates a clock of the CPU 50, controls the power supply circuit 70 to start supplying electric power to the memory controlling circuit 54 and the memory for saved data 56, and then outputs the accumulative step count data 152*c* to the CPU 50. Then, the CPU 50 stores the accumulative step count data 152*c* in the memory for saved data 56 via the memory controlling circuit 54. Thereafter, the micon 68 stops the clock of the CPU 50, and controls the power supply circuit 70 to stop supplying the electric power to the memory controlling circuit 54 and the memory for saved data 56.

Figure 8:
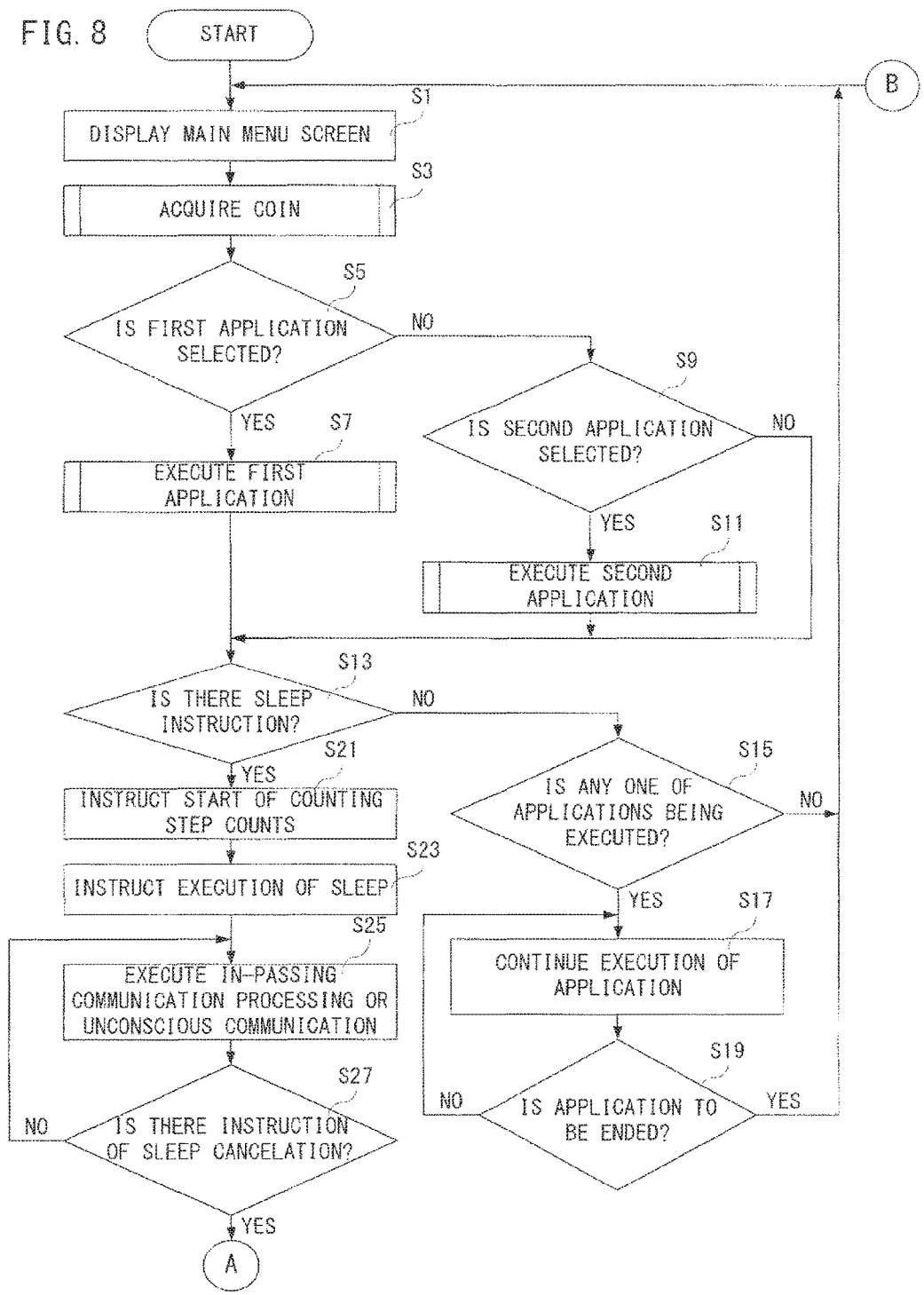
FIG. 8 is a flowchart showing a part of entire processing by a CPU shown in FIG. 3.
Figure 9:
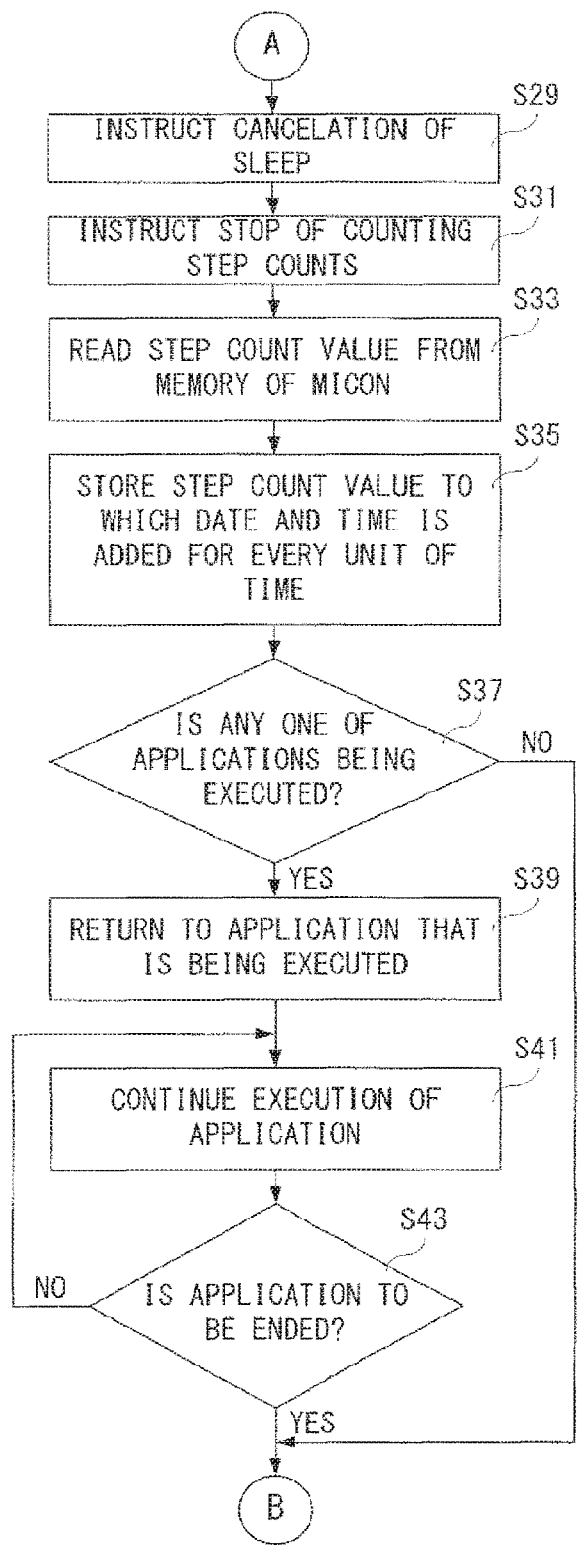
FIG. 9 is a flowchart showing another part of the entire processing by the CPU shown in FIG. 3, and being sequel to FIG. 8.

Each of FIG. 8 and FIG. 9 is entire processing by the CPU 50 shown in FIG. 3. When the main power supply of the game apparatus 10 is turned on, the CPU 50 starts entire processing to display the main menu screen 200 as shown in FIG. 4(A) in a step S1 as shown in FIG. 8. In a succeeding step S3, coin earning processing (see FIG. 10-FIG. 12) described later is executed. Then, in a step S5, it is determined whether or not the first application is selected. That is, it is determined whether or not the button image 202 representing the first application is turned on on the main menu screen 200.

If "YES" in the step S5, that is, if the first application is selected, first application executing processing (see FIG. 15 and FIG. 16) described later is executed in a step S7, and then, the process proceeds to a step S13. On the other hand, if "NO" in the step S5, that is, if the first application is not selected, it is determined whether or not the second application is selected in a step S9. That is, it is determined whether or not the button image 204 representing the second application is turned on on the main menu screen 200.

If "YES" in the step S9, that is, if the second application is selected, second application executing processing (see FIG. 17) described later is executed in a step S11, and then, the process proceeds to the step S13. On the other hand, if "NO" in the step S9, that is, if execution of the second application is not selected, the process proceeds to the step S13 as it is.

Additionally, in this embodiment, if "NO" in the step S9, the process directly proceeds to the step S13. However, if another application is selectable, it is determined whether or not execution of the other application is selected.

Furthermore, in this embodiment, a case that one application is selectable from the two applications is shown, but only one application may be made selectable.

That is, depending on the number of application programs that is stored in the memory cards 26, 28 and the memory for saved data 56, and the number of downloaded application programs, the number of selectable applications is variably set.

Returning to FIG. 8, it is determined whether or not there is an instruction for sleep in the step S13. That is, the CPU 50 determines whether or not there is an instruction of sleep from the micon 68. Here, in a case that the opening and closing switch 42 is turned off, the micon 68 instructs the CPU 50 of the sleep.

If "NO" in the step S13, that is, if there is no instruction for sleep, it is determined whether or not any one of the applications is being executed in a step S15. If "NO" in the step S15, that is, if no application is being executed, the process returns to the step S1 as it is.

On the other hand, if "YES" in the step S15, that is, if any one of the applications is being executed, the application that is being executed is continued in a step S17. Successively, in a step S19, it is determined whether or not the application is to be ended. In the step S19, the CPU 50 determines whether or not there is an instruction for an application end from the user or the player.

If "NO" in the step S19, that is, if the application is not be ended, the process returns to the step S17 as it is. On the other hand, if "YES" in the step S19, that is, if the application is to be ended, the execution of the application is ended although the illustration is omitted, and the process returns to the step S1.

Alternatively, if "YES" in the step S13, that is, if there is an instruction for sleep, the micon 68 is instructed to start counting step counts in a step S21. In a next step S23, the micon 68 is instructed to execute the sleep. Accordingly, the micon 68 stops the clock of the CPU 50, and controls the power supply circuit 70 to stop supplying electric power to the circuit components except for the wireless communication module 64. Here, the CPU 50 stores the game data of the main memory 52 in the memory area for application (104, 106, . . . ), and then stops the application if the application is being executed.

It should be noted that the CPU 50 and the micon 68 are always supplied with the electric power as described above.

Successively, in a step S25, in-passing communication processing or unconscious communication processing is executed. Here, during the sleep, the clock of the CPU 50 has been stopped, and therefore, when the wireless communication module 64 receives a connection request signal and a connection admission signal from other game apparatuses 10 and access points, the wireless communication module 64 activates the CPU 50 to execute the in-passing communication processing or the unconscious communication processing. At this time, under the instruction of the CPU 50, the micon 68 controls the power supply circuit 70 to start supplying electric power to the memory controlling circuit 54 and the memory for saved data 56.

In a next step S27, it is determined whether or not there is an instruction for a sleep cancelation. That is, the CPU 50 determines whether or not a clock is operated by the micon 68. If "NO" in the step S27, that is, if there is no instruction for a sleep cancelation, the process returns to the step S25.

Here, the description, is made such that the processing in the steps S25 and S27 are executed by the CPU 50, but the CPU 50 actually executes no processing during the sleep. In a case that the CPU 50 is activated by the wireless communication module 64 and the micon 68, it executes in-passing communication, unconscious communication, and normal processing (game processing, etc.).

Alternatively, if "YES" in the step S27, that is, if there is an instruction for a sleep cancelation, the micon 68 is instructed to cancel the sleep in a step S29 shown in FIG. 9. In a succeeding step S31, the micon 68 is instructed to stop counting the step counts. Then, in a step S33, a step count value is read from the memory 68a of the micon 68, and in a step S35, each of the step count, values to which a date and time is added for every unit of time is stored.

That is, the CPU 50 reads the accumulative step count data 152c (the first to the n-th step count data 1520-152n) from the memory 68a of the micon 68 in the step S33, and writes the same in the data memory area 100 of the memory for saved data 56 in the step S35. At this time, the CPU 50 writes (overwrites) a copy of the current step count accumulative data 102d to the previous step count accumulative data 102c, and then stores (overwrites) the numerical value data of the total value of step counts acquired by adding the total value of step counts currently read to the current accumulative amount of step counts (the previous accumulative amount of step counts) indicated by the current step count accumulative data 102d (or previous step count accumulative data 102c) as current step count accumulative data 102d. Here, the current step count accumulative data 102d may be the numerical value data of the total value of step counts indicated by the accumulative step count data 102a, that is, the total value of step counts indicated by the first step count data 1020, the second step count data 1022, . . . , the m-th step count data 102m.

Returning to FIG. 9, in a step S37, it is determined whether or not any one of the applications is being executed. Here, the CPU 50 determines whether or not the execution of the application has been suspended due to the sleep during execution of the application. If "NO" in the step S37, that is, if no application is being executed, the process returns to the step S1 shown in FIG. 8.

On the other hand, if "YES" in the step S37, that is, if any one of the applications is being executed, the process is restarted (returns) to the application that is being executed in a step S39. At this time, the CPU 50 reads the game data stored in the memory area for application (104, 106, . . . ) before execution of the sleep, and writes (loads) the same in the main memory 52. Successively, in a step S41, the execution of the application is continued, and in a step S43, it is determined whether or not the application is to be ended.

If "NO" in the step S43, that is, if the application is not to be ended, the process returns to the step S41 as it is. On the other hand, if "YES" in the step S43, that is, if the application is to be ended, the execution of the application is ended although illustration is omitted, and the process returns to the step S1.

Figure 10:
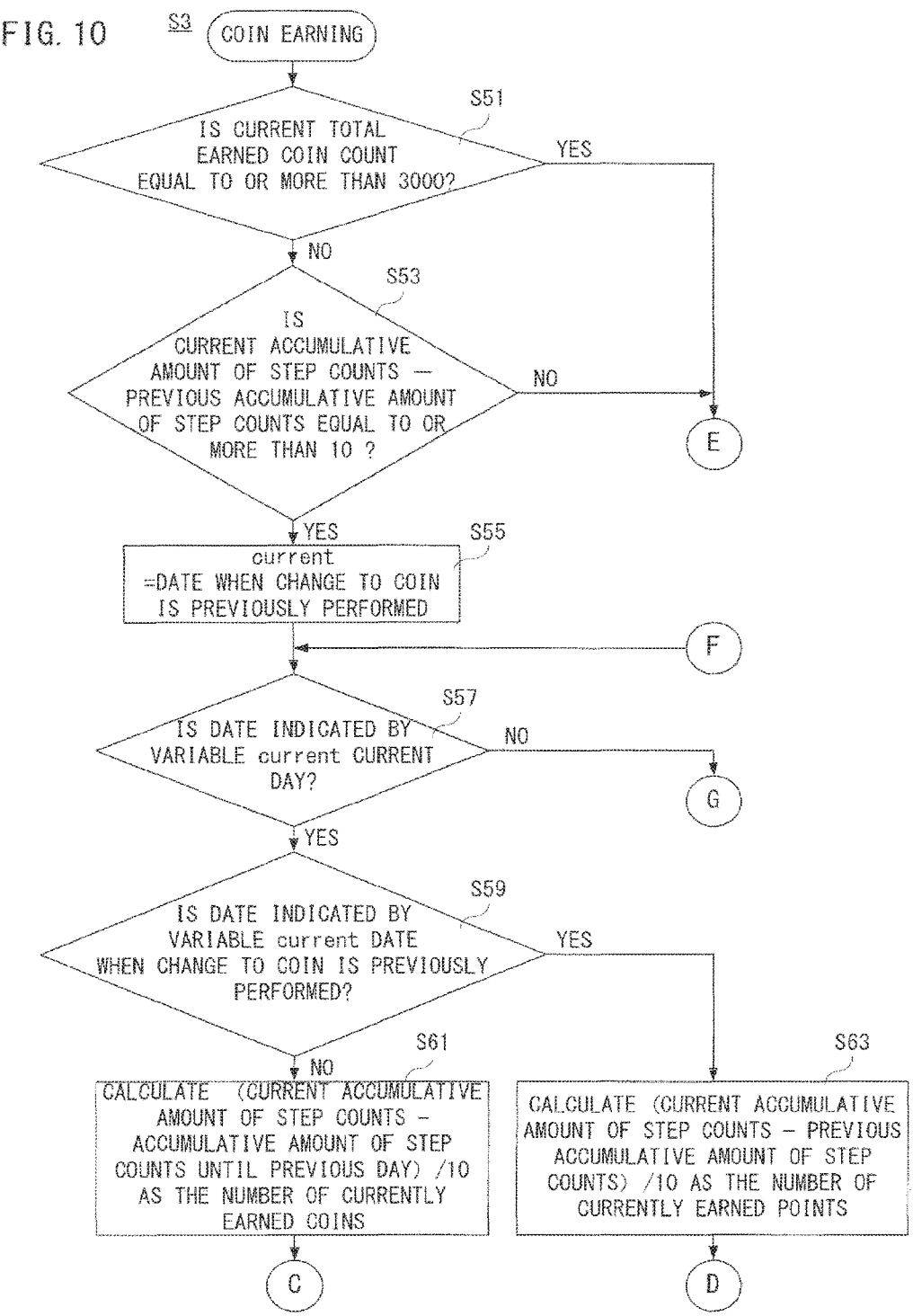
FIG. 10 is a flowchart showing a part of coin earning processing by the CPU shown in FIG. 3.

FIG. 10 is a flowchart showing the coin earning processing shown in the step S3 in FIG. 8. As shown in FIG. 10, when starling the coin earning processing, the CPU 50 determines whether or not the current total earned coin count is equal to or more than 3000 in a step S51. Here, as described above, the total earned coin count is a total number of earned coins indicated by the total earned coin count data 1028. That is, the CPU 50 determines whether or not the total earned coin count is equal to or more than 3000 (upper limit or not) with reference to the total earned coin count data 1028 stored in the data memory area 100 of the memory for saved data 56.

If "YES" in the step S51, that is, if the current total earned coin count is equal to or more than 3000, it is determined that the total coin count reaches the upper limit, and the process returns to the entire processing as it is. On the other hand, if "NO" in the step S51, that is, if the current total earned coin count is less than 3000, it is determined whether or not the current accumulative amount of step counts—the previous accumulative amount of step counts is equal to or more than 10 in a step S53. Here, the CPU 50 determines whether or not the user or the player walks by the minimum step counts required for conversion to a current earned coin. That is, in this embodiment, ten steps are converted Into one earned coin. Here, the CPU 50 performs the determination processing in the step S53 by subtracting the previous accumulative amount of step counts indicated by the previous step count accumulative data 102c stored in the data memory area 100 of the memory for saved data 56 from the current accumulative amount of step counts indicated by the current step count accumulative data 102d stored in the data memory area 100 of the memory for saved data 56. Here, a ratio of converting the step counts into an earned coin is mere one example and is not restricted to it.

If "NO" in the step S53, that is, if the current accumulative amount of step counts—the previous accumulative amount of step counts is less than 10, the process returns to the entire processing. On the other hand, if "YES" in the step S53, that is, if the current accumulative amount of step counts—the previous accumulative amount of step counts is equal to or more than 10, a date when a change to coin is previously performed is substituted into a variable current in a step S55. Here, the date when a change to coin is previously performed means the date when the step counts are previously converted into the earned coins.

In a succeeding step S57, it is determined whether or not the date indicated by the variable current is a current day (today). If "YES" in the step S57, that is, if the date-indicated by the variable current is a current day, it is determined whether or not the date indicated by the variable current is the date when a change to coin is previously performed in a step S59. Here, the CPU 50 determines whether or not the date indicated by the previous-time day data 102e is coincident with the date indicated by the variable current.

Figure 11:
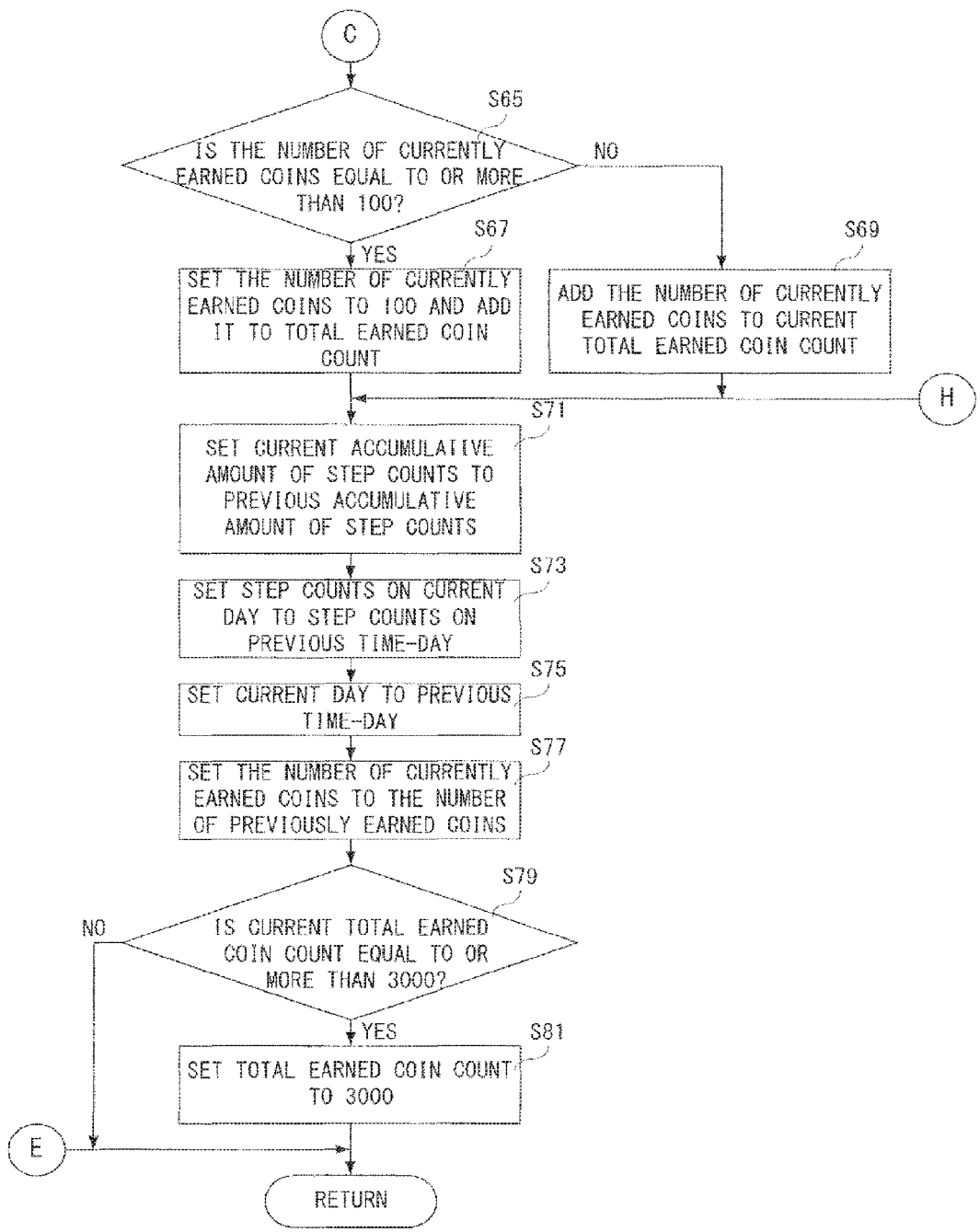
FIG. 11 is a flowchart showing a second part of the coin earning processing by the CPU shown in FIG. 3, and being sequel to FIG. 10.

If "NO" in the step S59, that is, if the date indicated by the variable current is not coincident with the date when a change to coin is previously performed, the date when a change to coin is previously performed is not identical with the current clay, and therefore, in a step S61, (the current accumulative amount of step counts–the accumulative amount of step counts until the previous day)/10 is evaluated as the number of currently earned coins, and the process proceeds to a step S65 shown in FIG. 11. Here, if the value is evaluated with a remainder, the earned coin is added by one. Or, if the value is evaluated with a remainder, the step count may be rounded down. This holds true hereunder. On the other hand, if "YES" in the step S39, that is, if the date indicated by the variable current is the date when a change to coin is previously performed, a change to coins is previously performed on the date the same as the current day, and therefore, (the current accumulative amount of step counts−the previous accumulative amount of step counts)/10 is calculated as the number of currently earned coins, and the process proceeds to a step S83 shown in FIG. 12.

In the step S65 shown in FIG. 11, it is determined whether or not the number of currently earned coins is equal to or more than 100. If "YES" in the step S65, the number of currently earned coins is set (corrected) to 100 to add it to the total earned coin count in a step S67, and the process proceeds to a step S71. Thus, by executing the processing in the step S67, the maximum number of earned coins that can be converted a day is restricted. If an unlimited number of earned coins that can be converted a day is allowed, a large difference occurs in the game processing between the users or the players who are different in amounts of walking. This is also because by restricting the number of earned coins that can be converted a day, it is possible to urge the user or the player to make moderate walking continuously. This holds true for a case that the number of earned coins is restricted hereunder. However, the unlimited number of earned coins that can be converted a day may be allowed. On the other hand, if "NO" in the step S65, that is, if the number of currently earned coins is less than 100, the number of currently earned coins is added to the current total earned coin count in a step 369, and the process proceeds to the step S71.

Figure 12:
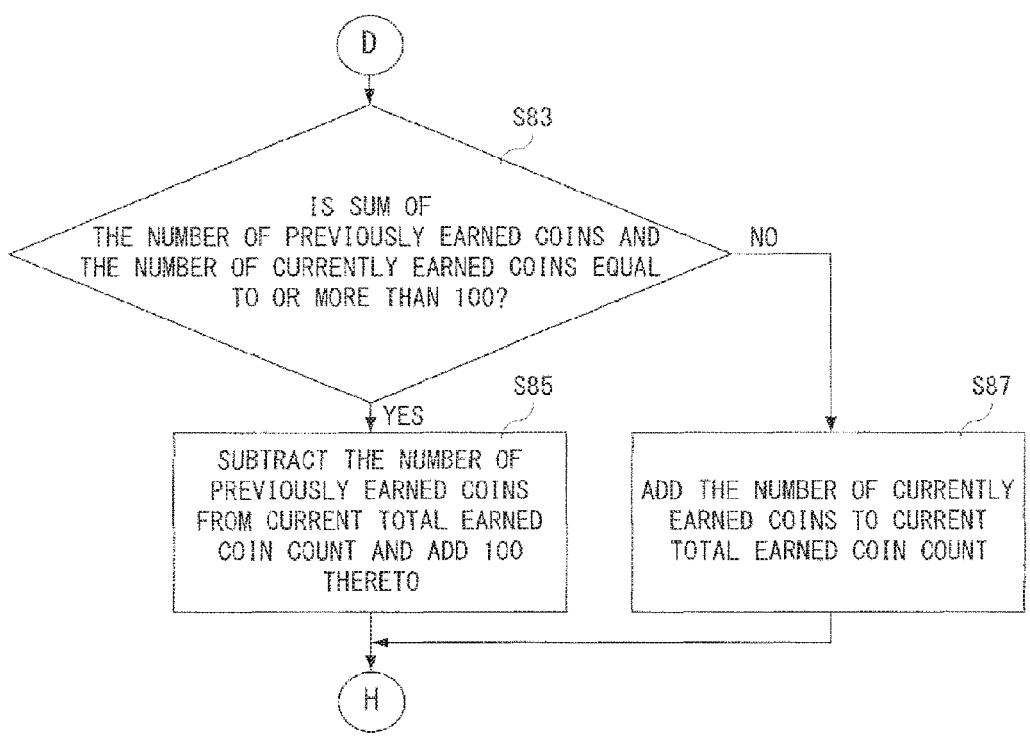
FIG. 12 is a flowchart showing a third part of the coin earning processing by the CPU shown in FIG. 3, and being sequel to FIG. 10.

Additionally, as shown in FIG. 12, in the step S83, it is determined whether or not the sum of the number of previously earned coins and the number of currently earned coins is equal to or more than 100. Here, the number of previously earned coins is the number of earned coins indicated by the previously earned coin count data 1030. If "YES" in the step S83, that is, if the sum of the number of previously earned coins and the number of currently earned coins is equal to or more than 100, 100 is added after the number of previously earned coins is subtracted from the current total earned coin count in a step S85, and the process proceeds to the step S71 shown in FIG. 11. That is, the maximum number of earned coins that can be earned a day is restricted. On the other hand, if "NO" in the step S83, that is, if the sum of the number of previously earned coins and the number of currently earned coins is less than 100, the number of currently earned coins is added to the current total earned coin count in a step S87, and then, the process proceeds to the step S71.

Returning to FIG. 11, in the step S71, the current accumulative amount of step counts is set to the previous accumulative amount of step counts, and in a step S73, the step counts on the current day is set to the step counts on the previous-time day. In addition, in a step S75, the current day is set to the previous-time day, and in a step S77, the number of currently earned coins is set to the number of previously earned coins. Here, the step counts on the current day is a total value of step counts indicated by the m-th step count data 102m dated today out of the accumulative step count data 102a. The current clay is a today's date to be calculated on the basis of the time counted by the RTC 68b.

Here, in this embodiment, in the step S77, the number of currently earned coins is set to the number of previously earned coins for simplicity, but strictly, the processing is different between a case that "YES" is determined in the step S59 and a case that "NO" is determined in the step S59. More specifically, in a case that "NO" is determined in the step S59, the processing in the step S77 is as it is, but in a case that "YES" is determined in the step S59, the sum of the number of previously earned coins and the number of currently earned coins is set to the number of previously earned coins in the step S77.

This is because that if the step counts are converted into earned coins three times or more a day, whether or not the sum of the earned coins at latest two times is above 100 is determined in the step S83 described later, resulting in inconvenience.

Then, in a step S79, it is determined whether or not the current total earned coin count is equal to or more than 3000. If "NO" in the step S79, the entire processing is returned as it is. On the other hand, if "YES" in the step S79, the total earned coin count is set to 3000 in a step S81, and the process returns to the entire processing. That is, by executing the processing in the step S81, a restriction is imposed on the total earned coin count. The reason why the restriction is imposed on the total earned coin count is to prevent a large difference hi the content of the game from occurring between the users or the players who frequently carry the game apparatus 10 and the users or the players who do not frequently carry the game apparatus 10. That is, this is because of reducing unfairness between the users or the players.

Figure 13:
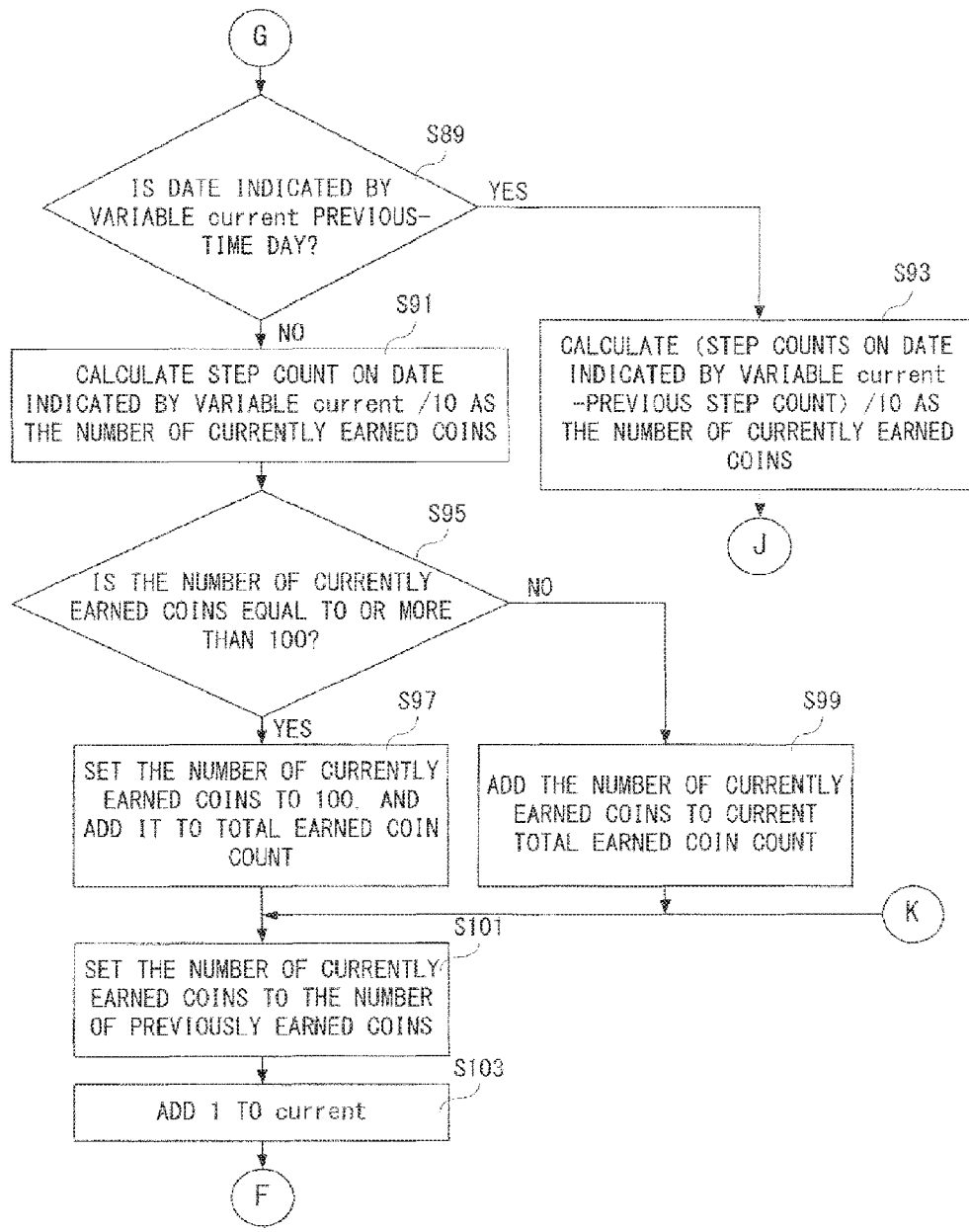
FIG. 13 is a flowchart showing a fourth part of the coin earning processing by the CPU shown in FIG. 3, and being sequel to FIG. 10.

Additionally, as shown in FIG. 10, if "NO" in the step S57, it is determined whether or not the date indicated by the variable current is the previous-time day in a step S89 shown in FIG. 13. If "NO" in the step S89, that is, if the date indicated by the variable current is not the previous-time day, all the step counts on the date indicated by the variable current has not yet been converted into coins, the step counts on the date indicated by the variable current/10 is calculated as the number of currently earned coins in a step S91, and the process proceeds to a step S95. On the other hand, if "YES" in the step S89, that is, if the date indicated by the variable current is the previous-time day, out of all the step counts on the date indicated by the variable current, a part (step counts on the previous-time day) is converted into coins, and the rest is not converted into coins, and therefore, in a step S93, (the step counts on the date indicated by the variable current−the step counts on the previous-time day)/10 is calculated as the number of currently earned coins, and the process proceeds to a step S105 shown in FIG. 14.

In the step S95, it is determined whether or not the number of currently earned coins is equal to or more than 100. If "YES" in the step S95, the number of currently earned coins is set to 100 which is added to the total earned coin count in a step S97, and the process proceeds to a step S101. On the other hand, if "NO" in the step S95, the number of currently earned coins is added to the current total earned coin count in a step S99, and the process proceeds to the step S101.

Figure 14:
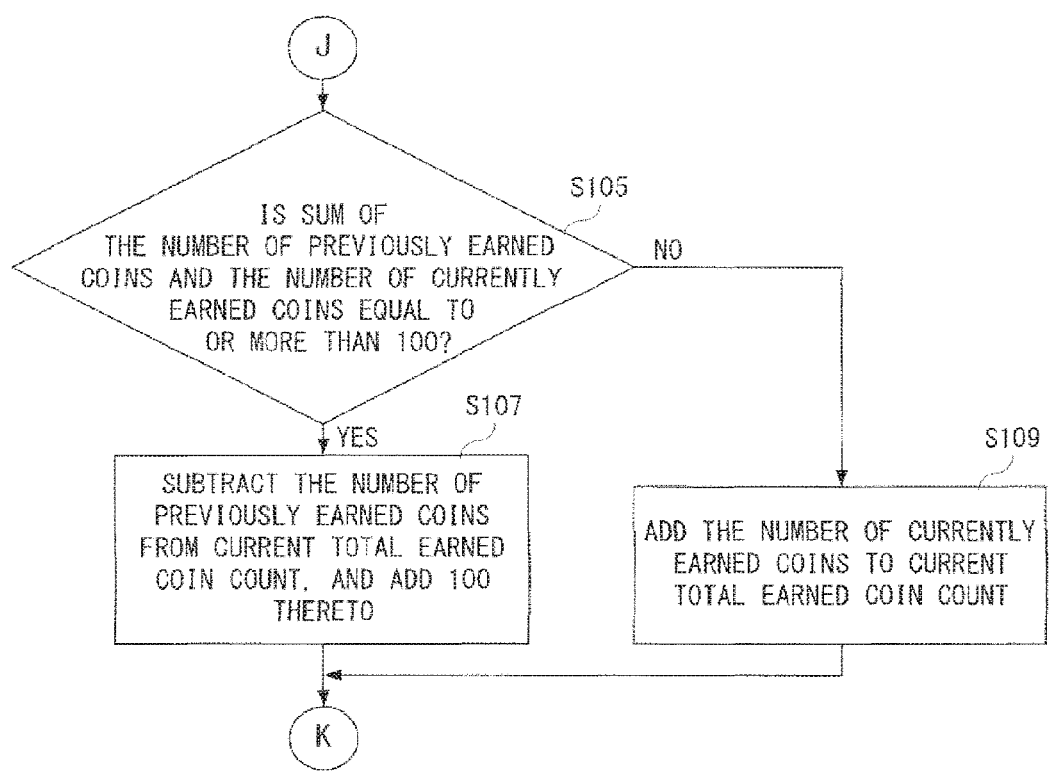
FIG. 14 is a flowchart showing a fifth part of the coin earning processing by the CPU shown in FIG. 3, and being sequel to FIG. 13.

Additionally, as shown in FIG. 14, in the step S105, it is determined whether or not the sum of the number of previously earned coins and the number of currently earned coins is equal to or more than 100. If "YES" in the step S105, the number of previously earned coins is subtracted from the current total earned coin count, and 100 is added thereto in a step S107, and the process proceeds to the step S101 shown in FIG. 13. On the other hand, if "NO" in the step S105, the number of currently earned coins is added to the current total earned coin count in a step S109, and the process proceeds to the step S101.

In the step S101, the number of currently earned coins is set to the number of previously earned coins. Then, in a step S103, 1 is added to the variable current, and the process returns to the step S57 shown in FIG. 10.

That is, by repeating the processing in the steps S57, S89 to S109, the step counts from the date when a change to coin is previously performed to the date previous to the current day (today) are converted into the earned coins every day.

Figure 15:
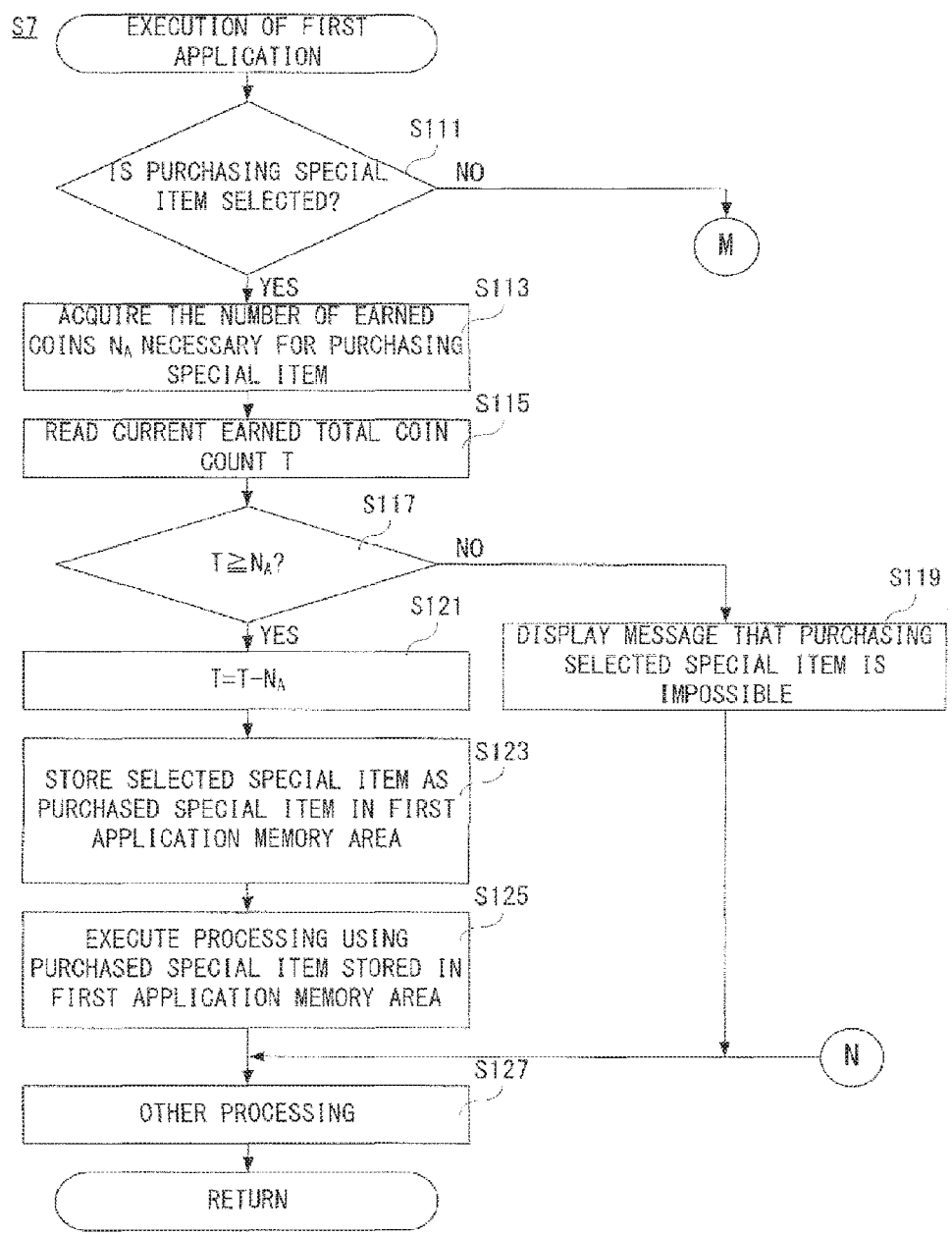
FIG. 15 is a flowchart showing a part of first application executing processing by the CPU shown in FIG. 3.
Figure 16:
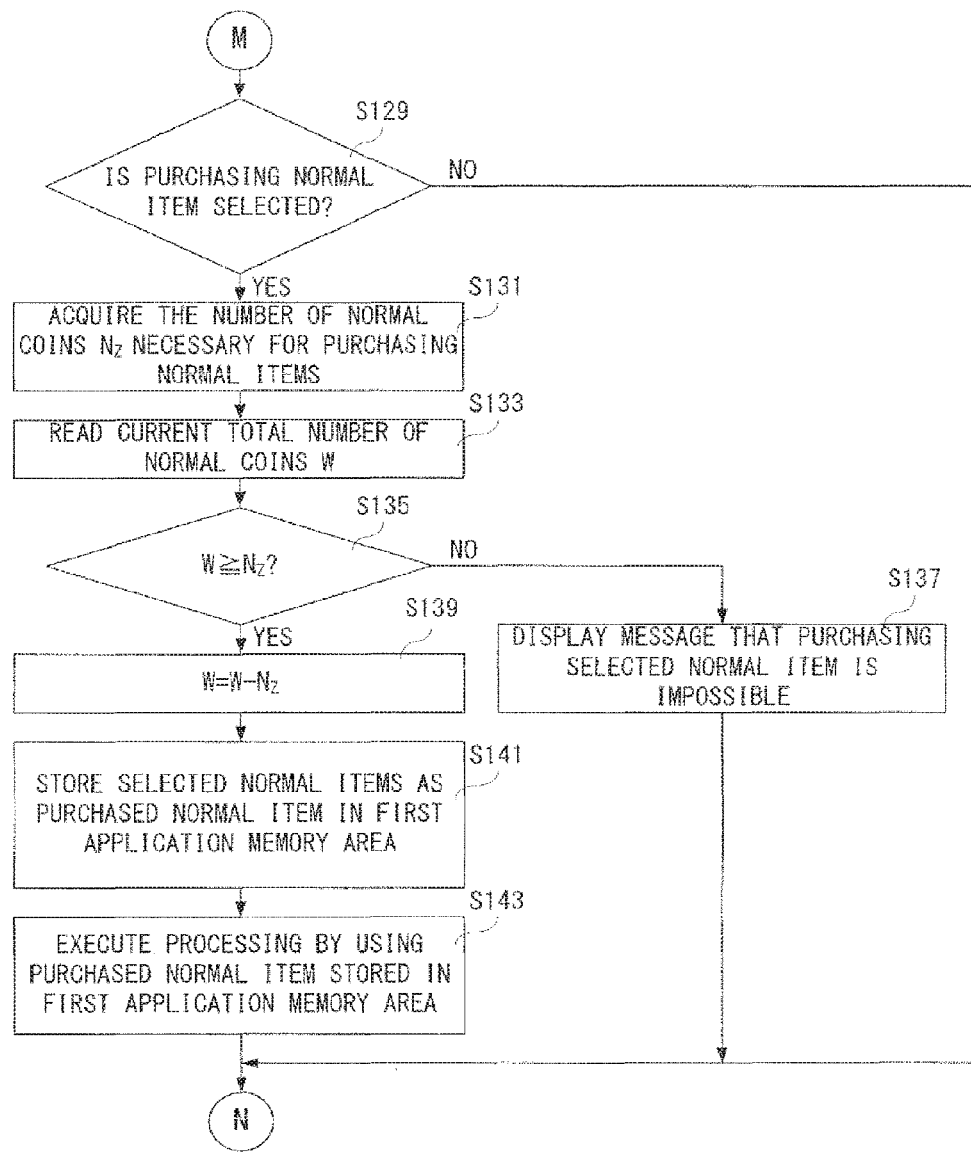
FIG. 16 is a flowchart showing another part of the first application executing processing by the CPU shown in FIG. 3.

FIG. 15 and FIG. 16 are flowcharts showing the first application executing processing shown in the step S7 in FIG. 8. As shown in FIG. 15, when starting the first application executing processing, the CPU 50 determines whether or not purchasing the special item is selected in a step S111. Here, the CPU 50 determines whether or not any one of the button images 310, 312 is turned on on the item purchasing screen 300 shown, in FIG. 4(B) by the user or the player.

If "NO" in the step S111, that is, if the purchasing the special item is not selected, the process proceeds to a step S129 shown in FIG. 16. On the other hand, if "YES" in the step S111, that is, if purchasing the special item is selected, the number of earned coins $N_A$ necessary for purchasing the special item (special items A, B in this embodiment) is acquired in a step S113. Here, the number of earned coins $N_A$ necessary for purchasing the special Items (A, B) is decided in advance.

In a succeeding step S115, the current total earned coin count T indicated by the total earned coin count data 1028 is read. In a next step S117, it is determined whether or not the total earned coin count T is equal to or more than the necessary number of earned coins $N_A$. If "NO" in the step S117, that is, if the total earned coin count T is less than, the necessary number of earned coins $N_A$, a message that purchasing the selected special item is impossible is displayed in a step S119, and the process proceeds to a step S127.

On the other hand, if "YES" in the step S117, that is, if the total earned coin count T is equal to or more than the necessary number of earned coins $N_A$, $T-N_A$ is set to the total earned coin count T in a step S121, and the selected special item is stored in the first application memory area 104 as a purchased special item (possessed special item) m a step S123. That is, the flag as to the selected special item is turned on to thereby update the item data 104a. In a next step S125, processing by using the purchased special item stored in the first application memory area 104 is executed, and the process proceeds to the step S127.

Here, in this embodiment, in a case that the special Item is purchased, processing by using the special, item (purchased special item) is immediately executed. However, this is a mere one example, and the processing by using the purchased special item may be executed when there is an instruction from the user or the player. This holds true for a case that the normal item described later is purchased.

Furthermore, the processing by using the purchased special item corresponds to the processing of, if the purchased special item is a tool, performing a motion with the use of the tool by the player character. Also, this corresponds to the processing of making the player character invincible for a predetermined time by using the purchased special item, for example. These are mere examples, and there is no need of being restricted thereto.

Returning to FIG. 15, in the step S127, another processing is executed to return to the entire processing. Here, in the step S127, according to an instruction from the player, the CPU 50 makes the player character perform an arbitrary action, makes the player character move, etc. Furthermore, according to a control by the computer (CPU 50), the non-player character moving and so forth independent of an operation by the player is made to perform an arbitrary action, and the non-player character is made to move, and etc. In addition, the CPU 50 calculates scores and determines game clear and game over. Then, the CPU 50 executes processing according to a game event, processing of outputting a sound (music), and processing of displaying (updating) the game screen.

As shown in FIG. 16, in the step S129, it is determined whether or not purchasing the normal item is selected. Here, the CPU 50 determines whether or not any one of the button images 302-308 is turned on on the item purchasing screen 300 shown in FIG. 4(B) by the user or the player. If "NO" in the step S129, that is, if the normal item is not to be purchased, the process proceeds to the step S127 shown in FIG. 15 as it is. On the other hand, if "YES" in the step S129, that is, if the normal item is to be purchased, the number of normal coins $N_Z$ necessary for purchasing the normal item (the first to fourth items in this embodiment) is acquired in a step S131. Here, the number of normal coins $N_Z$ necessary for purchasing each of the first to fourth, items is decided in advance.

In a succeeding step S133, a current total number of normal coins W indicated by the total normal coin count data 104b is read. In a next step S135, it is determined whether or not total number of normal coins W is equal to or more than the necessary number of earned coins $N_Z$. If "NO" in the step S135, that is, if the total number of normal coins W is less than the necessary number of earned coins $N_Z$, a message that purchasing the selected normal item is impossible is displayed in a step S137, and the process proceeds to the step S127.

On the other hand, if "YES" in the step S135, that is, if the total number of normal coins W is equal to or more than the necessary number of earned coins $N_Z$, $W-N_Z$ is set to the total number of normal coins W in a step S139, and the selected normal item is stored as a purchased normal item (possessed normal item) in the first application memory area 104 in a step S141. That is, the flag as to the selected, normal item is turned on to thereby update the item data 104a. In a next step S143, processing by using the purchased normal item stored in the first application memory area 104 is executed, and the process proceeds to the step S127. Thus, even without using the earned coins, the normal item can be purchased by using the normal coins. That is, without the earned coins, the first application (game) can be advanced.

Figure 17:
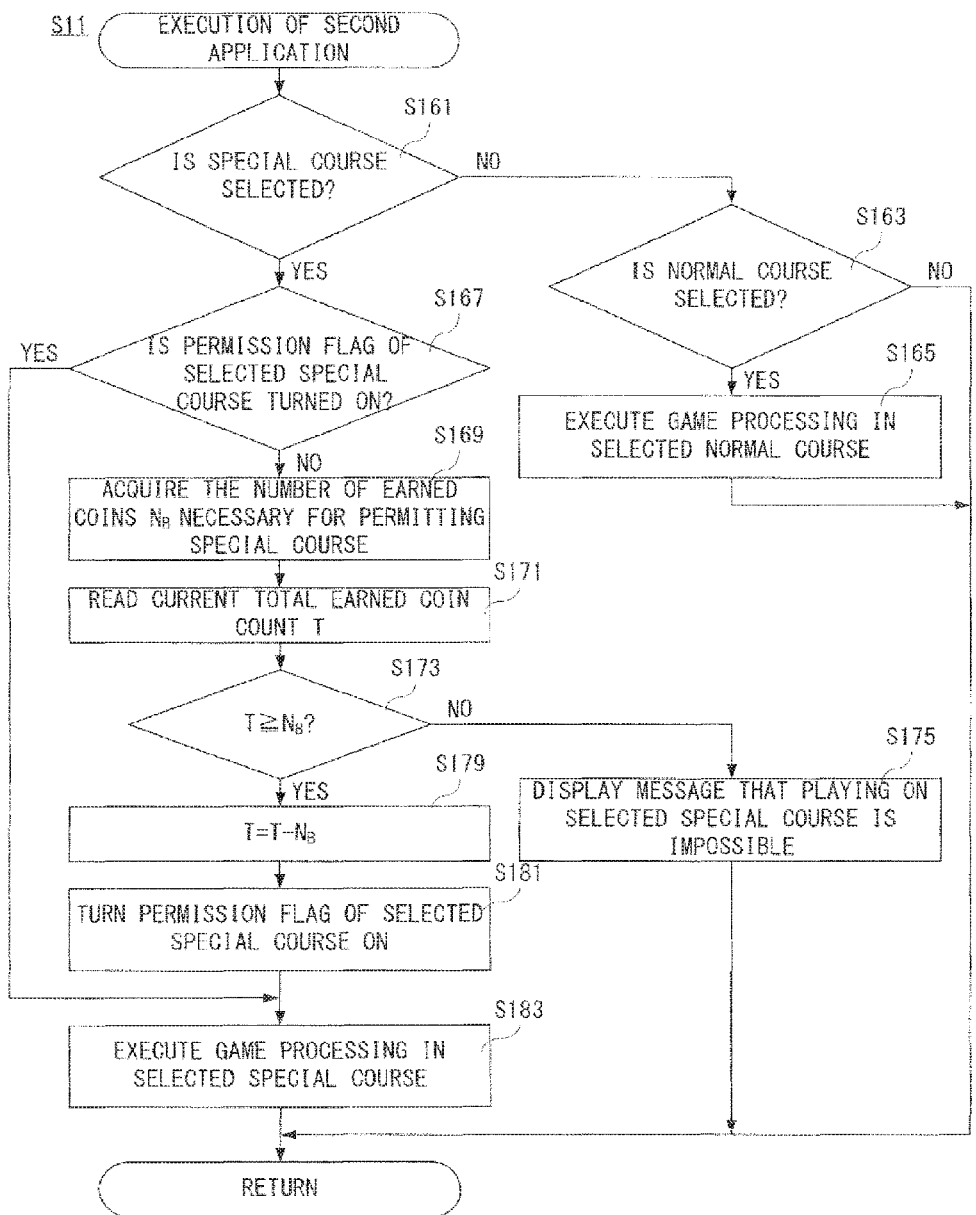
FIG. 17 is a flowchart showing second application executing processing by the CPU shown in FIG. 3.

FIG. 17 is a flowchart showing second application executing processing in the step S11 shown in FIG. 8. As shown in FIG. 17, when starting the second application executing processing, the CPU 50 determines whether or not the special course is selected in a step S161. Here, the CPU 50 determines whether or not the button image 410 or the button image 412 is turned on on the course selecting screen 400 shown in FIG. 4(C). If "NO" in the step S161, that is, if the special course is not selected, it is determined whether or not the normal course is selected in a step S163. Here, the CPU 50 determines whether or not any one of the button images 402-408 is turned on on the course selecting screen 400 shown in FIG. 4(C).

If "NO" in the step S163, that is, if the normal course is not selected, the process returns to the entire process as it is. On the other hand, if "YES" in the step S163, that is, if the normal course is selected, game processing in the selected normal course is executed in a step S165, and the process returns to the entire process.

Here, in the step S165, the CPU 50 moves the player character in the selected normal course according to an instruction by the user or the player. Furthermore, the computer (CPU 50) moves the non-player character in the selected normal course. In addition, the CPU 50 calculates scores and determines game clear and game over. Then, the CPU 50 executes processing according to a game event, processing of outputting a sound (music), and processing of displaying (updating) the game screen. Thus, even without using the earned coins, it is possible to play in the normal course. That is, even without the earned coins, the second application (game) can be advanced.

On the other hand, if "YES" in the step S161, that is, if the special course is selected, it is determined whether or not the permission flag of the selected special course (special courses A, B in this embodiment) is turned on with reference to the course permission data 106a in a step S167. If "YES" in the step S167, that is, if the permission flag of the selected special course is turned on, the process proceeds to a step S183. On the other hand, if "NO" in the step S167, that is, if the permission flag of the selected special course is turned off, the number of earned coins $N_B$ necessary for permitting the selected special course is acquired in a step S169. Here, the number of earned coins $N_B$ necessary for permitting each of the special courses A, B is decided in advance. In a next step S171, the current total earned coin count T is read with reference to the total earned coin count data 1028.

Then, in a step S173, it is determined whether or not the total earned coin count T is equal to or more than the necessary number of earned coins $N_B$. If "NO" in the step S173, that is, if the total earned coin count T is less than the necessary number of earned coins $N_B$, a message that playing on the selected special course is impossible is displayed in a step S175, and the process returns to the entire processing. On the other hand, if "YES" in the step S173, that is, if the total earned coin count T is equal to or more than the necessary number of earned coins $N_B$, $T-N_B$ is set to the total earned coin count T in a step S179, and the permission flag of the selected special course is turned on in a step S181. Accordingly, the course permission data 106a is updated.

Successively, in the step S183, game processing on the selected special course is executed, and the process returns to the entire processing. In the step S183, the CPU 50 moves the player character on the selected special course according to an instruction from the user or the player. Furthermore, the computer (CPU 50) moves the non-player character on the selected special course. In addition, the CPU 50 calculates scores and determines game clear and game over. Then, the CPU 50 executes processing according to a game event, processing of outputting a sound (music), and processing of displaying (updating) the game screen.

Here, as described above, the normal course (the first to fourth courses) is selectable irrespective of the number of earned coins, and thus, the processing of turning the permission flag on, etc. is not required.

Figure 18:
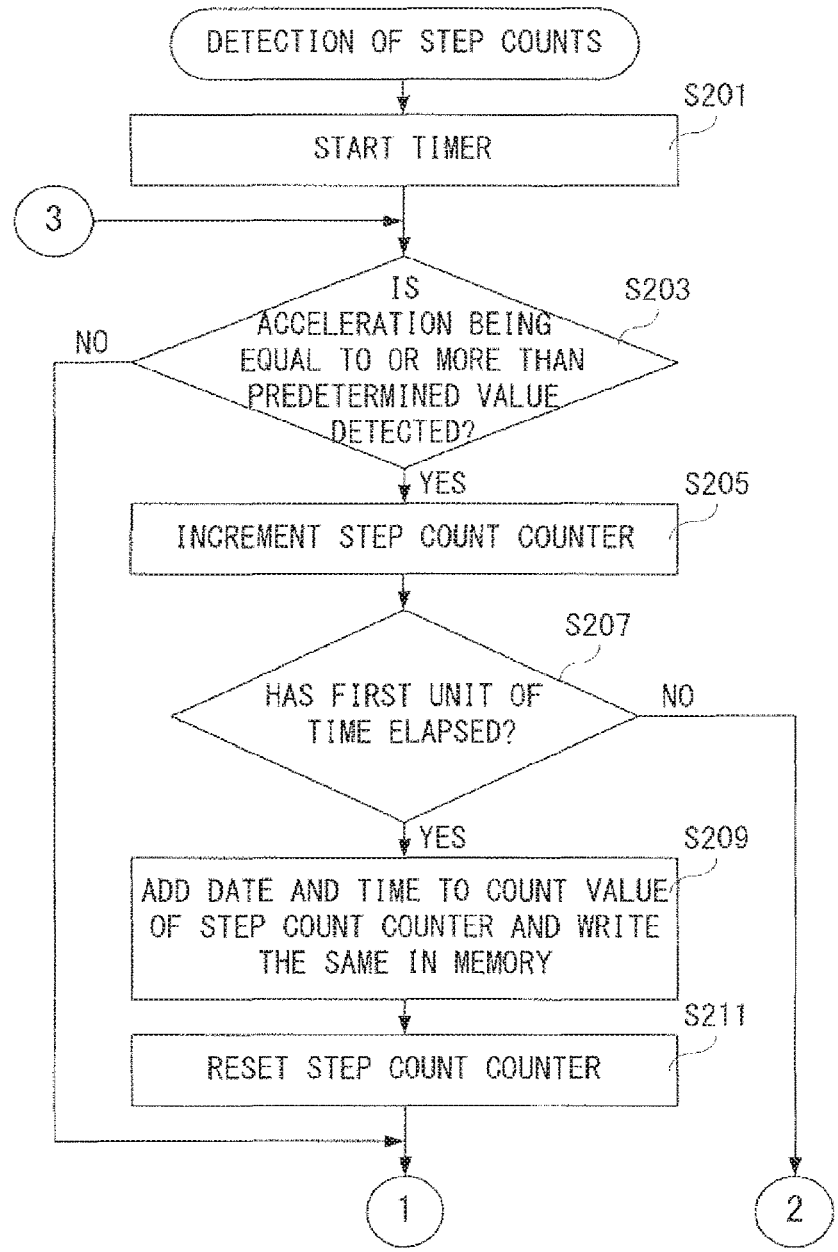
FIG. 18 is a flowchart showing apart of step count detecting processing by a in icon shown in FIG. 3.
Figure 19:
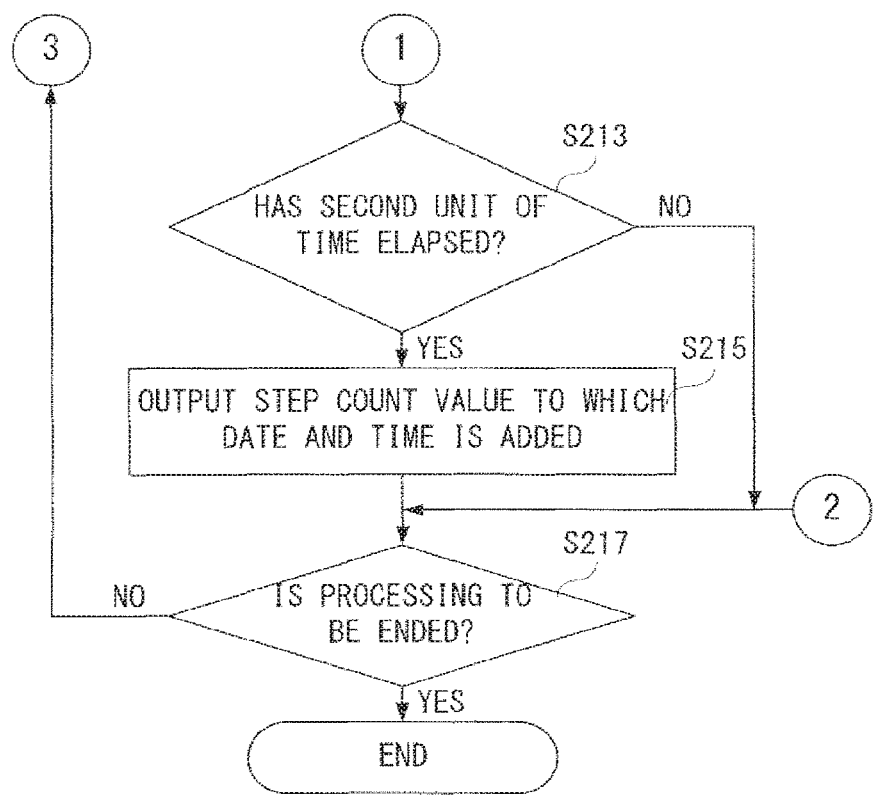
FIG. 19 is a flowchart showing another part of the step count detecting processing by the micon shown in FIG. 3 and being sequel to FIG. 18.

FIG. 18 and FIG. 19 are flowcharts showing step count detecting processing by the micon 68. As shown in FIG. 18, when starting the step count detecting processing, the micon 68 starts the timer 152a in a step S201. In a next step S203, it is determined whether or not an acceleration being equal to or more than a predetermined value is detected. If "NO" in the step S203, that is, if an acceleration being equal to or more than a predetermined value is not detected, it is determined that the step counts are not detected, and the process proceeds to a step S213 shown in FIG. 19 as it is. On the other hand, if "YES" in the step S203, that is, if an acceleration being equal to or more than a predetermined value is detected, it is determined that step counts are detected, and the step count counter 152b is incremented in a step S205.

Successively, in a step S207, it is determined whether or not a first unit of time has elapsed. Here, the micon 68 determines whether or not the first unit of time (one hour) has elapsed with reference to the count value of the timer 152a. If "NO" in the step S207, that is, if the first unit of time has not elapsed, the process proceeds to a step S217 shown in FIG. 19 as it is. On the other hand. If "YES" in the step S207, that is, if the first unit of time has elapsed, a date and time is added to the count value of the step count counter 152b, and the added one is written to the memory 68a in a step S209. Here, in the step S209, the n-th step count data 152n is collectively stored for each unit of time. At this time, the micon 68 calculates the date and time (date and time) from the time counted by the RTC 68b, and adds the date and time data corresponding to the calculated date and time to the n-th step count data 152n. In a next step S211, the step count counter 152b is reset, and the process proceeds to the step S213.

As shown in FIG. 19, in the step S213, it is determined whether or not a second unit of time has elapsed. Here, the micon 68 determines whether or not the second unit of time (three hours) has elapsed with reference to the count value of the timer 152a. If "NO" in the step S213, that is, if the second unit of time has not elapsed, the process proceeds to the step S217 as it is. On the other hand, If "YES" in the step S213, that is, if the second unit of time has elapsed, the step count value to which the date and time is added is output to the CPU 50 in a step S215, and the process proceeds to the step S217. That is, even if the game apparatus 10 is in the sleep state, the accumulative step count data 152c is stored (moved to) in the memory for saved data 56 every second unit of time. Although illustration is omitted, in the step S215, the micon 68 activates the CPU 50, and controls the power supply circuit 70 under the instruction of the CPU 50 to start supplying the electric power to the memory controlling circuit. 54 and the memory for saved data 56 as described above.

Then, in the step S217, it is determined whether to be ended or not. Here, the micon 68 determines whether or not there Is an end instruction of counting the step counts from the CPU 50. Here, strictly, when the opening and closing switch 42 is turned on, the micon 68 activates the clock of the CPU 50, and controls the power supply circuit 70 to start supplying the electric power to each of the circuit components. Then, the CPU 50 that returns from the sleep state instructs the micon 68 to stop counting the step counts.

If "NO" in the step S217, that is, if it is not to be ended, the process returns to the step S203 shown in FIG. 18 as it is. On the other hand, if "YES" in the step S217, that is, if it is to be ended, the step count detecting processing is ended.

Furthermore, as described, above, on the main menu screen 200 shown in FIG. 4(A), other applications (third application, fourth application, here) may sometimes be selected. For example, in FIG. 20(A), during a game according to a program of the third application (third application program), a hint displaying screen 500 to be displayed on the second LCD 18 (first LCD 16 may be possible) is shown. Also, in FIG. 20(B), during a game according to a program of the fourth application (fourth application program), a growth screen 600 to be displayed on the second LCD 18 (first LCD 16 may be possible) is shown.

As shown in FIG. 20(A), on the hint displaying screen 500, a selection screen 506 for selecting whether or not a hint is seen is displayed on the game screen including a player character 502, an enemy character 504 and a background. Although the detailed description is omitted, the selection screen 506 is automatically displayed according to the processing of the third application program (game program) or displayed according to an instruction from the player.

Furthermore, on the selection screen 506, a text for inquiring whether a hint is to be seen is displayed, and a button image 508 and a button image 510 are displayed. When the button image 508 is turned on, seeing a hint is selected. Alternatively, if the button image 510 is turned on, not seeing a hint is selected.

When the button image 508 is turned on, a hint not shown is displayed. For example, hints, such as a way to defeat the enemy character 504, a thing to be done next by the player are displayed in text, and a direction in which the player character 502 has to proceed is displayed by a designation image like an arrow. On the other hand, when the button image 510 is turned on, the selection, screen 506 is erased (undisplayed).

Here, in a case that the hint is seen, the earned coins are required to be used, and unless the total number of earned coins is equal to or more than the number necessary for seeing the hint, the selection screen 506 is not displayed. Or, even if the selection screen 506 is displayed, displaying a hint cannot be selected. Thus, on the selection screen 506 (region different from the selection screen 506), the current total number of earned coins and the number of coins necessary for seeing a hint may be displayed.

Thus, by using the earned coins, a hint can be displayed, and this makes it possible to play this game easily even if the game is a high difficulty level, and this makes it possible even for beginners who are unskilled in games to play this game easily. Also, the hint is not necessarily displayed, and this makes it possible for advanced players of games to have exhilaration and a sense of accomplishment by capturing this game without seeing the hint. Accordingly, irrespective of the level of proficiency with the game, it is possible for all the players to enjoy playing this game.

Here, by displaying a hint, the advancement of the game by the player is supported, but there is no need of being restricted thereto. For example, by using earned coins, the ability of the player character 502 is changed to thereby support, the advancement of the game. In such a case, the player characters 502 is increased in the remaining number, restored in the physical strength, is heightened in the attack power for a certain period of time, is made invincible for a certain period of time, or is increased in the number of allies, for example. Moreover, if there is a restriction on the number of attacks, the number of attacks is increased. In addition, the computer (CPU 50) may automatically clear a specific difficult course and mission, regard them as being cleared, and see the weak point of the enemy character. Also, an object which can be acquired after the advancement of the game without using the earned coins (object acquired through the normal route) may immediately be acquired without advancing the game by using the earned coins when there is not time to spend for the game, and so forth.

Alternatively, on the growth screen 600 shown in FIG. 20(B), a display pane 602, a display pane 604, and a display pane 606 are provided. In the display pane 602, a character 650 before growing possessed by the player or the player character is displayed. In the display pane 604, a grown character 652 from the character 650 is displayed. In the display pane 606, a text for inquiring whether or not to heighten the growth rate is displayed, and a button, image 608 and a button image 610 are displayed. When the button image 608 is turned on, heightening the growth rate is selected. When the button image 610 is turned on, not heightening the growth rate is selected.

When the button image 608 is turned on, the growth rate of the character 650 is changed. For example, whereas it generally takes several hours to several days in the game time (in the real time) for growing from the character 650 to the character 652, the character is immediately grown, or it takes a time shorter than several times to several days for the growth. On the other hand, when the button 610 is turned on, not changing the growth rate is selected to thereby undisplay (erase) the growth screen 600, returning to the game screen not shown.

Accordingly, by using earned coins, the game can be played in fast-forward, and similar to the third application program, the advancement of the game is supported. Here, the growth rate of the character is heighten (enhanced in the growth), but there is no need of being restricted thereto. As another example, the growth of crops and flowers may be enhanced. Also, a time until architecture like a building, etc. is completed may be shortened. In addition, in a game in which regular time intervals are required to make the player character perform actions (attack, defense, etc.), for example, the time intervals can be shortened. Moreover, in place of heightening the growth rate, the level of the player or the player character may be increased sooner than in normal playing.

Also, in this embodiment, the game (the third application) displaying the hint displaying screen 500 in FIG. 20(A) and the game (the fourth application) displaying the growth screen 600 in FIG. 20(B) are described as separates games, but they may be different scenes in the same game (application).

In a case that the third application and the fourth, application are executable in the game apparatus 10, a third application program 700 shown in FIG. 21(A) and a fourth application program 750 shown in FIG. 21(B) are stored in the memory for saved data 56 shown in FIG. 5.

As shown in FIG. 21(A), the third application program 700 is made up of an image displaying program 700a, a display selecting program 700b, a total earned coin count acquiring program 700c, a hint displaying program 700d, etc.

The image displaying program 700a and the total earned coin count acquiring program 700c are the same as the above-described image displaying program 94a and total earned coin count acquiring program 94c, and thus, a redundant description is omitted.

The display selecting program 700b is a program for displaying the hint displaying screen 500 as shown in FIG. 20(A) according to an instruction from the player or a predetermined event, and determining whether or not the button image 508 or the button image 510 is turned on on the hint displaying screen 500. The hint displaying program 700d is a program for displaying a hint in response to the button image 508 being turned on.

Although illustration is omitted, in the third application program 700, a main processing program, a sound outputting program, a backup program, a various processing program, etc, are included.

Also, although illustration is omitted, in the data memory area 100 of the memory for saved data 56, a memory area for third application is provided, and in the memory area for third application, game data including data for giving a hint is stored. Here, the data for giving a hint is text data, image data, audio data, etc. as to a hint.

Furthermore, as shown in FIG. 21(B), the fourth application program 750 is made up of an image displaying program 750*a*, a growth selecting program 750*b*, a total earned coin count acquiring program 750*c*, a growth rate changing program 750*d*, etc.

The image displaying program 750*a* and the total earned coin count acquiring program 750*c* are the same as the above-described image displaying program 94*a* and total earned coin count acquiring program 94*c*, and thus, a redundant description is omitted.

The growth selecting program 750*b* is a program for displaying the growth screen 600 as shown in FIG. 20(B) according to an instruction by the player or a predetermined event, and determining whether or not the button image 608 or the button image 610 is turned on on the growth screen 600. The growth rate changing program 750*d* is a program for changing the growth rate of the character in response to the button image 608 being turned on.

Although illustration is omitted, in the fourth application program 750, a main processing program, a sound outputting program, a backup program, a various processing program, etc. are included.

Moreover, although illustration is omitted, in the data memory area 100 of the memory for saved data 56, a memory area for fourth application is provided, and in the memory area for fourth, application, game data including data of the growth rate as to a predetermined character is stored.

Figure 22:
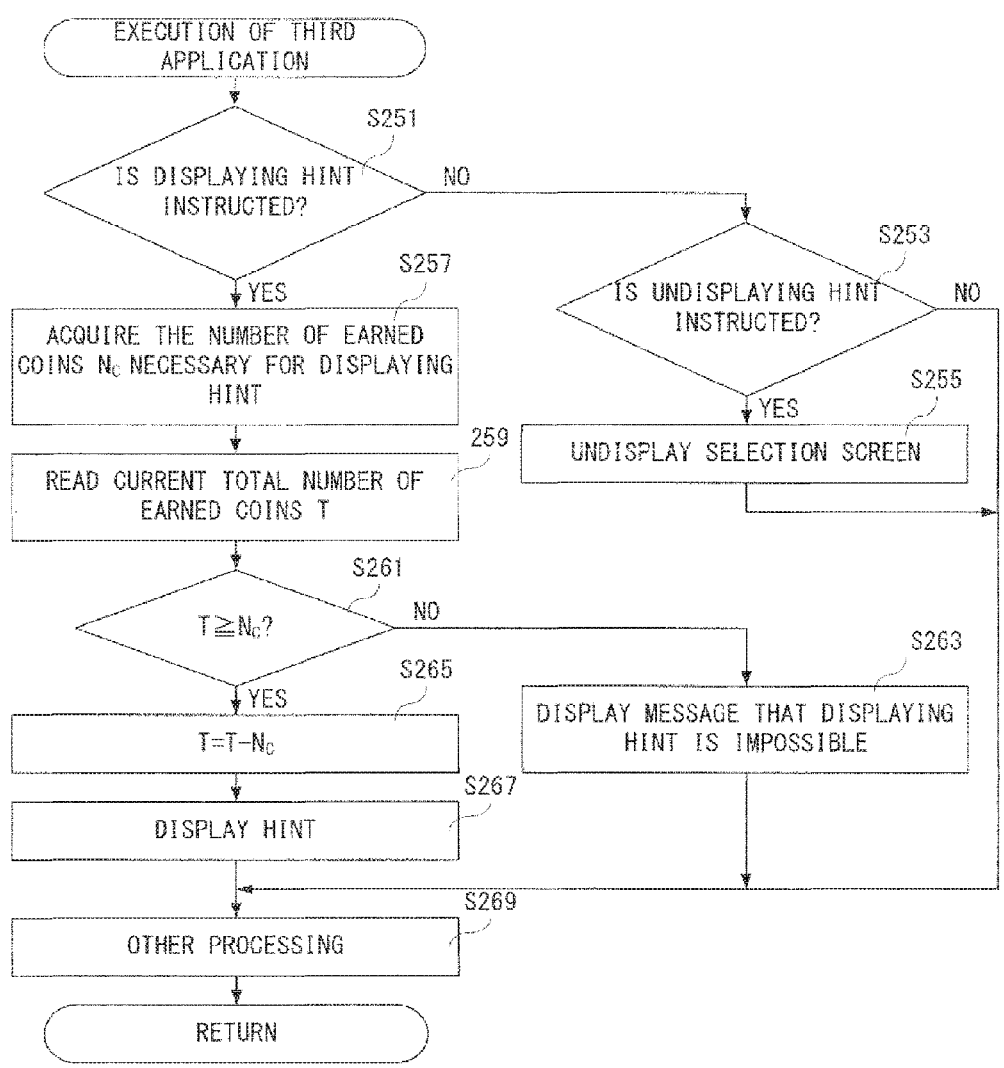
FIG. 22 is a flowchart showing third application executing processing by the CPU shown in FIG. 3.
Figure 23:
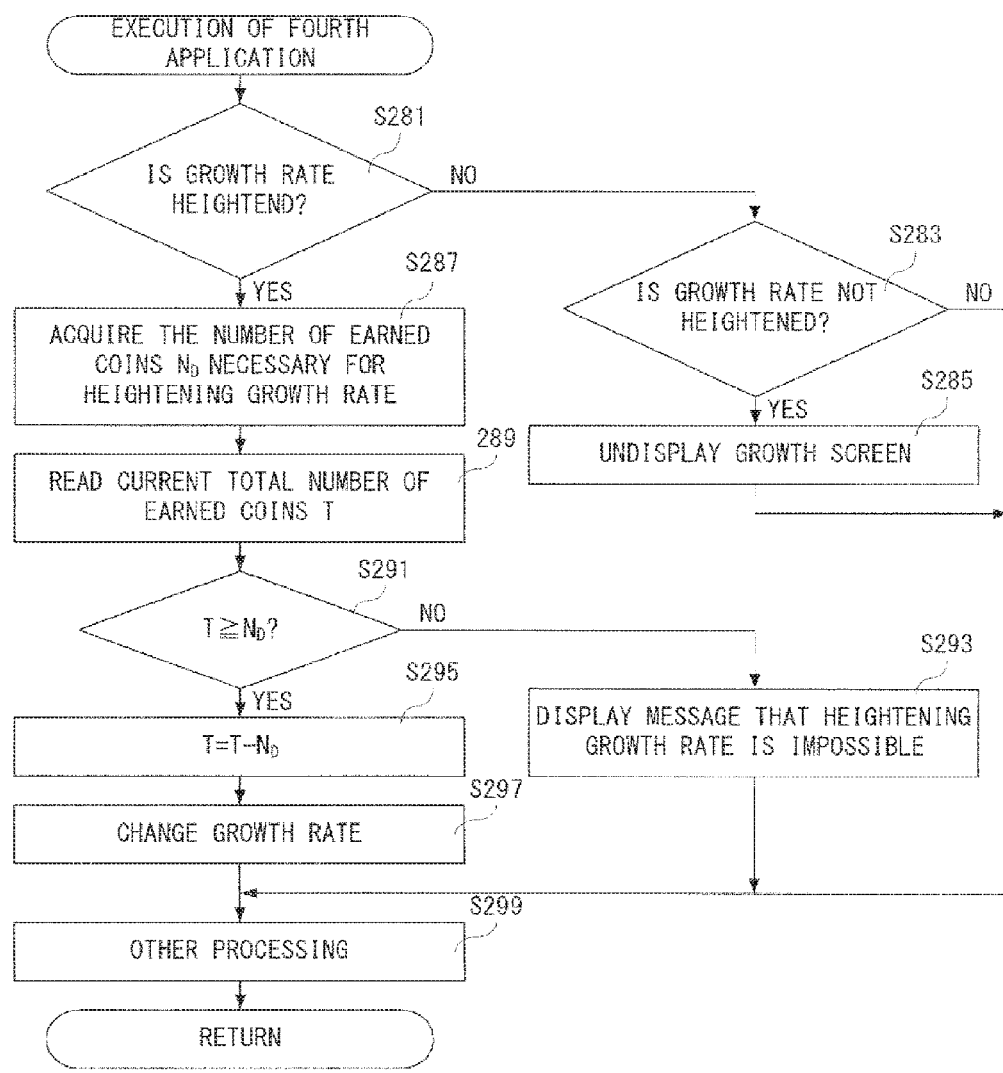
FIG. 23 is a flowchart showing fourth application executing processing by the CPU shown in FIG. 3.

FIG. 22 shows a flowchart showing third application executing processing, and FIG. 23 shows a flowchart showing fourth application executing processing. Although illustration is omitted, similar to the steps S5 to S11 shown in FIG. 8, whether the third application or the fourth application is selected is determined, and the selected application is executed. Such selecting and executing processing is inserted between the steps S9 and S13, or executed in place of the processing in the steps S5 to S11.

As shown in FIG. 22, when starting the third application executing processing, the CPU 50 determines whether or not displaying a hint is instructed in a step S251. Here, the CPU 50 determines whether or not the button, image 508 is turned on on the hint, displaying screen 500 shown in FIG. 20(A). It should, be noted that the hint displaying screen 500 is displayed not directly after the third application executing processing is started, but when a predetermined condition is satisfied, such as an occurrence of a predetermined event in the game, and an input of an instruction from the player, for example.

If "NO" in the step S251, that is, if the button image 508 is not turned on, it is determined whether or not undisplaying a hint is instructed in a step S253. That is, the CPU 50 determines whether or not the button image 510 is turned on on the hint displaying screen 500 shown in FIG. 20(A).

If "NO" in the step S253, that is, if the button image 510 is not turned on, the process proceeds to a step S269 as it is. On the other hand, if "YES" in the step S253, that is, if the button image 510 is turned on, the selection screen 506 is undisplayed in a step S255, and the process proceeds to the step S269.

Alternatively, if "YES" in the step S251, that is, if the button image 508 is turned on, the number of earned coins $N_C$ necessary for displaying the hint is acquired in a step S257. Here, the number of earned coins $N_C$ necessary for displaying a hint is decided in advance.

In a succeeding step S259, the current total number of earned coins T indicated by the total coin count data 1028 is read. In a next step S261, it is determined whether or not the total number of earned coins T is equal to or more than the necessary number of earned coins $N_C$. If "NO" in the step S261, that is, if the total number of earned coins T is less than the necessary number of earned coins $N_C$, a message that displaying a hint is impossible is displayed in a step S263, and the process proceeds to the step S269. On the other hand, if "YES" in the step S261, that is, if the total number of earned coins T is equal to or more than the necessary number of earned coins $N_C$, T–$N_C$ is set to the total number of earned coins T in a step S265, a hint as described above is displayed in a step S267, and the process proceeds to the step S269. That is, by using (consuming) a necessary number of earned coins, the hint can be displayed.

In the step S269, other processing is executed, and the process returns to the entire process shown, in FIG. 8 and FIG. 9. In the step S269, the CPU 50 makes the player character 502 perform an arbitrary action, move the player character 502, and so forth according to the instruction from the player in response to the hint displayed in the step S267. Furthermore, according to a control by the computer (CPU 50), the non-player character (enemy character 504, etc.) moving and so forth independent of an operation by the player is made to perform an arbitrary action, and is made to move. In addition, the CPU 50 calculates scores and determines game clear and game over. Then, the CPU 50 executes processing according to a game event, processing of outputting a sound (music), and processing of displaying (updating) the game screen.

As shown in FIG. 23, when starting the fourth application executing processing, the CPU 50 determines whether or not the growth rate is heightened in a step S281. Here, the CPU 50 determines whether or not the button image 608 is turned on on the growth screen 600 shown in FIG. 20(B). Here, the growth screen 600 is displayed not directly after the fourth application executing processing is started, but when a predetermined condition is satisfied, such as an occurrence of a predetermined event in the game, and an input of an instruction from the player, for example.

If "NO" in the step S281, that is, if the button image 608 is not turned on, it is determined whether or not the growth rate is not heightened in a step S283. Here, the CPU 50 determines whether or not the button image 610 is turned on on the growth screen 600 shown in FIG. 20(B). If "NO" in the step S283, that is, if the button image 610 is not turned on, the process proceeds to a step S299 as it is. On the other hand, if "YES" in the step S283, that is, if the button image 610 is turned on, it is determined that the growth rate is not heightened, the growth, screen 600 is undisplayed in a step S285, and the process proceeds to the step S299.

Furthermore, if "YES" in the step S281, that is, if the button image 608 is turned on, the number of earned coins $N_D$ necessary for heightening the growth rate is acquired in a step S287. Here, the number of earned coins $N_D$ necessary for heightening the growth rate is decided in advance.

In a succeeding step S289, the current total number of earned coins T indicated by the total coin count data 1028 is read. In a next step S291, it is determined whether or not the total number of earned coins T is equal to or more than the necessary number of earned coins $N_D$. If "NO" in the step S291, that is, if the total number of earned coins T is less than the necessary number of earned coins $N_D$, a message that heightening the growth rate is impossible is displayed in a step S293, and the process proceeds to the step S299. On the other hand, if "YES" in the step S291, that is, if the total number of earned coins T is equal to or more than the necessary number of earned coins $N_D$, T–$N_D$ is set to the total number of earned coins T in a step S295, the growth rate is changed (heightened) in a step S297, and the process proceeds to the step S299. That is, by using (consuming) a necessary number of earned coins, the game spending a time can be played, in fast-forward.

In the step S299, other processing is executed, and the process returns to the entire processing shown in FIG. 8 and FIG. 9. In the step S299, for example, the CPU 50 makes the character 650 grow on the basis of the growth rate changed in the step S297, makes the player character or the character 650 perform an arbitrary action, makes the player character or the character 650 move and so forth according to an instruction from the player. Furthermore, according to a control by the computer (CPU 50), the non-player character (enemy character, etc.) moving independent of an operation by the player is made to perform an arbitrary action, and is made to move. In addition, the CPU 50 calculates scores and determines game clear and game over. Then, the CPU 50 executes processing according to a game event, processing of outputting a sound (music), or processing of displaying (updating) the game screen.

According to this embodiment, the earned coins evaluated through conversion as a correlation value of the step counts are stored in the shared data memory area, and this can commonly be used among a plurality of applications executed by the game apparatus. In addition, in this embodiment, by merely carrying the game apparatus in the sleep state, it becomes possible to acquire data from other game apparatuses and access points through the in-passing communication and the unconscious communication, and acquire the special item, play on the special course, gain a hint, and play the game in fast-forward depending on the number of step counts.

Here, in this embodiment, a game apparatus having an in-passing communication function and an unconscious communication function is explained, but a game apparatus with other functions (applications) may be possible.

Also, in this embodiment, when the main menu screen is displayed, the coin earning processing is executed, but there is no need of being restricted thereto. When the game apparatus shifts from the sleep state to the non-sleep state, this may be executed. Alternatively, this may be executed in both cases.

In addition, in this embodiment, in a case that the game apparatus is closed, a shift to the sleep mode is made, but there is no need of being restricted thereto. In a case that there is no operation for a certain period of time (10 minutes, for example) with the main power supply of the game apparatus turned on (normal mode), or in a case that a predetermined operation is executed, a shift to the sleep mode may be made. In such a case, if any operation is executed or if a predetermined operation is executed in the sleep state, a shift (return) to the non-sleep mode (normal mode) may be made.

In addition, in this embodiment, as one example of the power-saving mode, the sleep mode is shown to thereby perform a power control in the game apparatus as described above, but the power of the LCD may merely be turned off.

Furthermore, in this embodiment, the normal item and the special item are displayed on the same screen on which an item to be purchased is selected, but the normal item and the special item may be displayed on the different screens. This holds true for the normal course and the special course.

In addition, in this embodiment, when the special item is selected, the total earned coin count and the number of earned coins necessary for purchase are compared to determine whether or not the special item can be purchased. As another embodiment, when the item purchasing screen is displayed, the total earned coin count and the number of earned coins necessary for purchase are compared to determine whether or not the special item can be purchased. The special item that cannot be purchased may be non-displayed or grayed out. This holds true for the normal item and the special course (course selecting screen). Also, as to the display of a hint (hint displaying screen) and the change of the growth rate (growth screen), in a case that the total number of earned coins is less than the necessary number of earned coins, a message that displaying a hint is impossible or a message that changing the growth rate is impossible may be displayed without displaying the screen itself.

Also, in this embodiment, steps counts are converted into earned coins so as to commonly be used in a plurality of applications, but the step counts may be used as it is.

Moreover, the configuration of the game apparatus need not be restricted to that of this embodiment. For example, one camera or no camera may be appropriate. Additionally, the touch panel may be provided on the two LCDs.

Furthermore, in this embodiment, the micon starts or stops counting step counts according to an instruction from the CPU, but the micon may start counting step counts when the opening and closing switch is turned off, and stop counting step counts when the opening and closing switch is turned on.

Additionally, in this embodiment, the earned coin count data out of the shared data memory area is only necessary to be shared with a plurality of applications, and therefore, at least the earned coin count data is included in the shared data memory area, and the accumulative step count data, the previous step count accumulative data, the current step count accumulative data, the previous-time day data and the previous-time day step count data except for it may be included in another memory area (main body-dedicated memory area, for example) that cannot be shared.

In addition, in this embodiment, by opening and closing a foldable game apparatus, the normal mode and the sleep mode are switched. However, a cover capable of being opened and closed is provided to the game apparatus, and by opening and closing the cover, the normal mode and the sleep mode may be switched. Alternatively, a jacket capable of containing the game apparatus is provided, and by taking the game apparatus out from the jacket or putting it in the jacket, the normal mode and the sleep mode can be switched. That is, in a case that the user or the player does not use the apparatus, the sleep mode may be set to thereby execute an in-passing communication and the unconscious communication and to count step counts.

Moreover, the present invention can be applied to other hand-held information terminals implementing easy portability, such as cellular phone, a PDA, etc. without being restricted to the handheld game apparatus.

This invention can also be applied to a console game apparatus which is set at home to be used, or the like, a personal computer terminal, a game system, in which respective processing for game processing are distributedly performed by each of a plurality of computers, etc.

Also, in the above-described embodiment, a pedometer function is provided to the game apparatus 10, but a pedometer is provided separately from the game apparatus 10, and step counts measured by the pedometer may be acquired by the game apparatus. For example, a game system 1000 shown in FIG. 24 includes the game apparatus 10 and a pedometer 1200. The game apparatus 10 and the pedometer 1200 transmit, and receive data by a short distance wireless communication, such as IrDA, for example. They may be connected by wire so as to make communications.

It should be noted that the game apparatus 10 shown in the above-described embodiment is used here, but by eliminating and so forth the acceleration sensor 88 from the game apparatus 10, the pedometer function may be lost.

Figure 24:
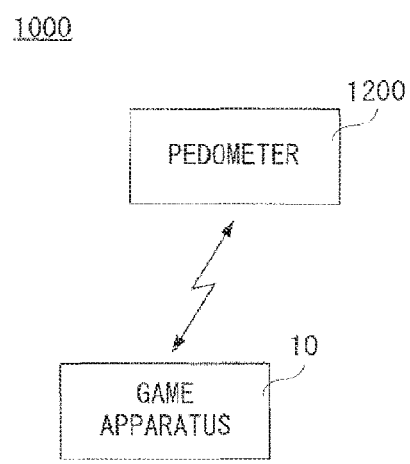
FIG. 24 is an illustrative view showing one example of a game system of the present invention.

In a case that the game system 1000 as shown in FIG. 24 is configured, a memory card 28 for communicating with the pedometer 1200 is used. The electric configuration of the memory card 28 is shown in FIG. 25.

Figure 25:
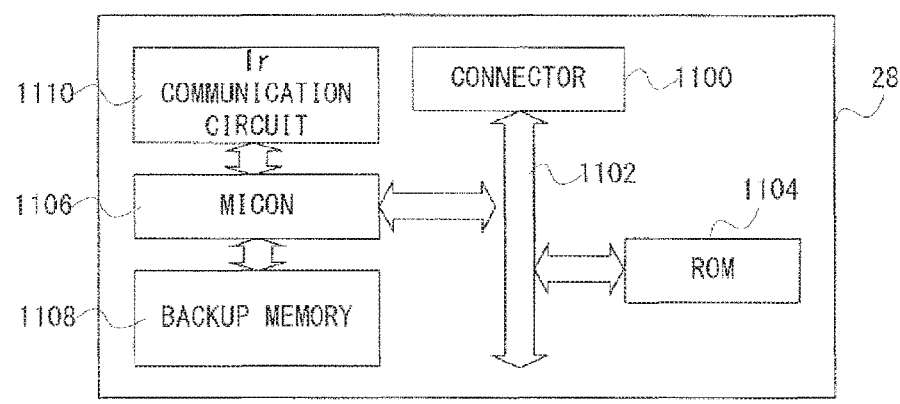
FIG. 25 is an illustrative view showing an electric configuration of a memory card when the game system shown in FIG. 24 is configured.

As shown in FIG. 25, the memory card 28 includes a connector 1100 to be coupled to a connector not shown connected to the memory card IF 62, and the connector 1100 is connected with a ROM 1104 and a micon 1106 via a bus 1102. The micon 1106 is connected with a backup memory 1108 and an Ir communication circuit 1110.

The micon 1106 controls writing and reading to and from the backup memory 1108 under the control of the CPU core 34, and controls an infrared rays communication (Ir communication) by utilizing the Ir communication circuit 1110. That is, the CPU 50 writes and reads data to and from the backup memory 1108 via the micon 106. Furthermore, the CPU 50 transmits and receives data with the pedometer 1200 via the micon 1106 and the Ir communication circuit 1110. Here, although not illustrated, a communication port of the Ir communication circuit 1110 is provided at a position (on the top surface, for example) exposed when the memory card 28 is loaded into the game apparatus 10.

The ROM 1104, as described above, stores in advance a game program for a game to be executed by the game apparatus 10, image data (character image, background image, item image, icon (button) image, message image, etc.), data of the sound, (music) necessary for the game (sound data), etc. The backup memory 1108 stores (saves) proceeding data of the game, result date of the game, etc. As a backup memory 1108, a nonvolatile memory, such as a flash memory, an SRAM to which power is supplied from a battery, etc. can be used.

Also, the game apparatus 10 may contain the Ir communication circuit 1110, and may store the game program and the save data in the memory for saved data 56 within the game apparatus 10. This makes it possible to eliminate the need for the memory card 28 to make communications with the pedometer 1200 and to make direct, communications with the game apparatus 10 and the pedometer 1200.

Figure 26:
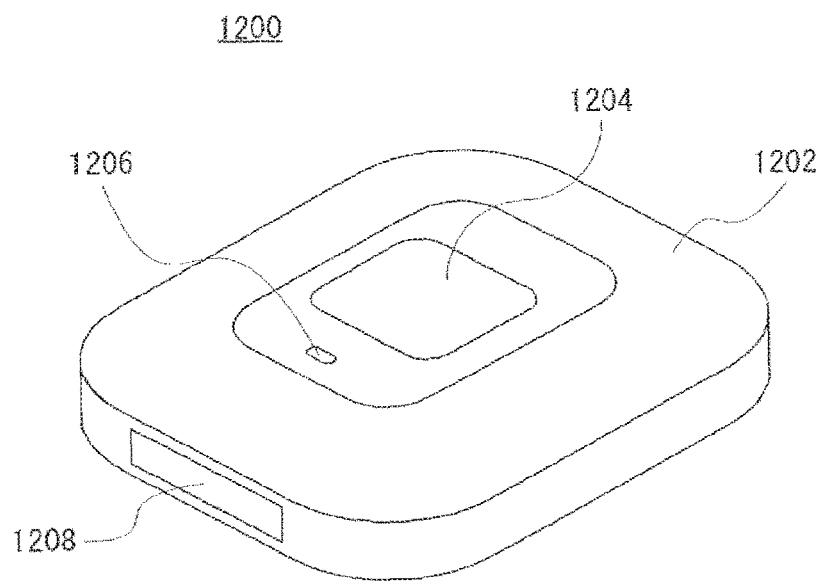
FIG. 26 is a perspective view showing one example of an appearance of a pedometer shown in FIG. 24.

FIG. 26 is a perspective view showing one example of the pedometer 1200. The pedometer 1200 has a housing 1202 in a roughly rectangular parallelepiped shape, and the housing 1202 is made small enough to be put in a pocket, etc. of the player or the user, and has lengths longitudinally and transversely in the order of 3 to 4 cm, and a thickness of the order of 1 cm, as one example. The housing 1202 is provided with a push button 1204 on one main, surface (top surface). In a case that the Ir communication circuit 1110 of the memory card 28 is in a communication standby state, when the push button 1204 is pushed by the user, the pedometer 1200 starts to communicate with the memory card 28, that is, the game apparatus 10. Furthermore, at the end of the push button 1204, an LED 1206 is provided. The LED 1206 is two-color LED, for example, and represents an operating condition of the pedometer 1200 by a color, and a flashing pattern. Furthermore, on the side surface (tip-end surface) of the housing 1202, an infrared communication port 1208 is provided. Additionally, as an operating power source of the pedometer 1200, a coin shaped lithium cell (CR2032) is used, for example, and on the other main surface (bottom surface) of the housing 1202, a battery cover is detachably provided.

Figure 27:
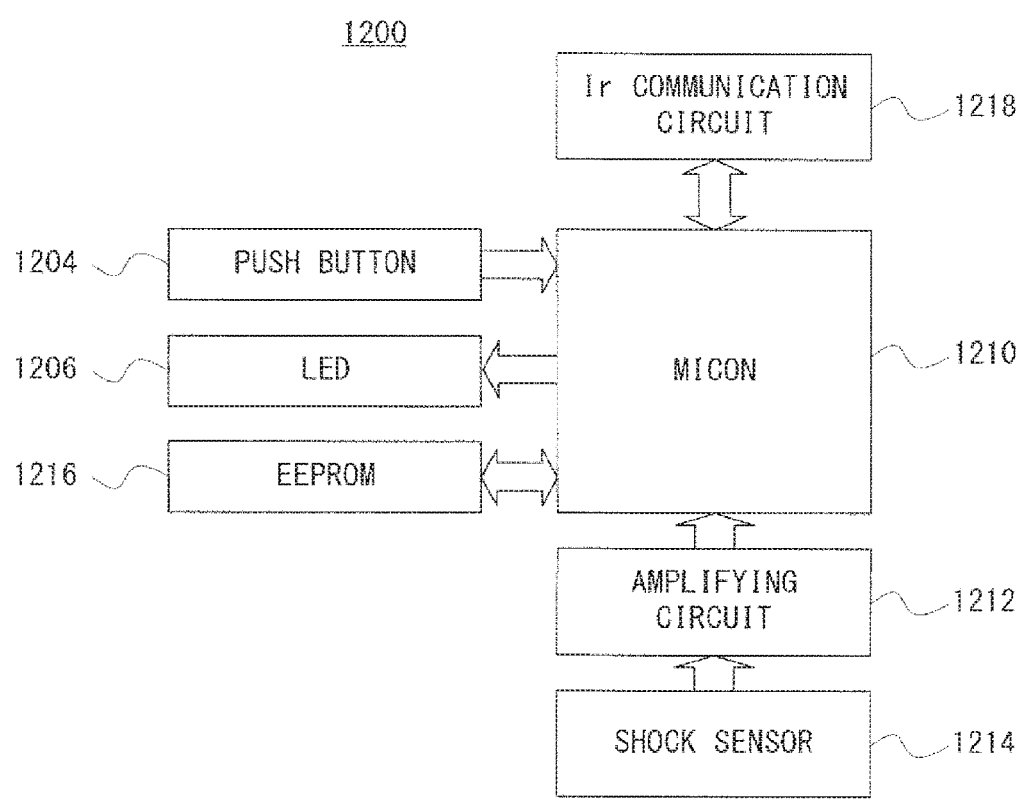
FIG. 27 is a block diagram showing an electric configuration of the pedometer shown in FIG. 24 and FIG. 26.

FIG. 27 is a block diagram showing one example of an electric configuration of the pedometer 1200. The pedometer 1200 includes a micon 1210, and the micon 1210 is connected with a shock sensor 1214 via an amplifying circuit 1212. The micon 1210 is further connected with the push button 1204, the LED 1206, an EEPROM 1216 and an Ir communication circuit 1218.

The micon 1210 is a low power consumption micon integrated with a step counter algorithm, and controls an entire operation of the pedometer 1200, such as detection of output data from the shock sensor 1214, writing and reading data to and from the EEPROM 1216, flashing of the LED 1206, and an infrared rays communication by utilizing the Ir communication circuit 1218, etc.

The shock sensor 1214 is a sensor for detecting a motion according to walking by the player or the user, and a shock sensor (acceleration sensor) used for an impact detection of an HDD can be applied thereto. The shock sensor 1214 is arranged in two-axis directions in this embodiment, and this makes it possible for the user to count or detect a step count (the number of steps) with the pedometer 1200 in the pocket, the bag, etc. The output from the shock sensor 1214 is amplified in the amplifying circuit 1212 and then input to the micon 1210. Since the micon 1210 contains an AD converter, the micon 1210 performs a sampling on the output from the shock sensor 1214 to acquire output data (acceleration data). The micon 1210 counts the step counts on the basis of the output data and the step counter algorithm, and sequentially stores an accumulated value (the number of counts) of the step counts per unit of time in the EEPROM 1216. That is, the EEPROM 1216 stores a historical record of step count values per unit of time as step count data.

Here, there is a limit to the storage area for the step count data in the EEPROM 1216. For example, in a case that a step count value is stored every minute, the EEPROM 1216 can store about seven day's historical records of the step counts. In a case that the storage area becomes full, the oldest-stored step count value is overwritten. Furthermore, in this embodiment, the unit of time for recording the step count value is set to one minute, but this may be changed to one hour, one day, etc., for example, as necessary.

The micon 1210 controls the color and the flashing pattern of the LED 1206 depending on the operating condition or state. For example, in a case that the number of steps on that day is above the step count set in advance, the color of the LED 1206 is changed from red to yellow green. Furthermore, when the push button 1204 is pushed, the micon 1210 starts communications with the game apparatus 10 (memory card 28) by utilizing the Ir communication circuit 1218, and blinks the LED 1206 for confirming the start of the communications and checking the operation.

When the push button 1204 is pushed to start communications, the micon 1210 reads an ID (identification information) of the pedometer 1200 from an internal ROM or the EEPROM 1216, and transmits the data including the ID to the game apparatus 10 through the Ir communication circuit 1218. Then, when receiving a request of step count data front the game apparatus 10, the micon 1210 reads necessary step count data from the EEPROM 1216 and transmits the same to the game apparatus 10.

Here, the game apparatus 10 stores the date and time information when the step count data is previously received from the pedometer 1200, and requests the step count value for a necessary time or the necessary number of count values, so that the micon 1210 can read the step count value for a necessary time or the necessary number of count values as far back as the past from the current step count value, and transmit the same to the game apparatus 10.

Also, in this game system 1000, the game apparatus 10 need not to count step counts, and may convert the step counts into the earned coins when receiving the step count data. More specifically, in the above-described entire processing (FIG. 8 and FIG. 9), the processing in the step S21, and steps S31 to S35 is deleted, and a step to determine whether or not step count data is received is provided between the step S1 and the step S3, and when the step count data is received, the coin earning processing in the step S3 may be executed. Furthermore, the micon 68 need not to execute the step counts detecting processing (FIG. 18 and FIG. 19).

Here, processing of converting step counts into earned coins may be performed by the pedometer 1200. If so, the game apparatus 10 is only necessary to receive the number of earned coins from the pedometer 1200.

Although the present invention, has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus comprising an input device, the apparatus configured to at least:
    measure step counts using a motion detection device;
    store the measured step counts in a memory, the step counts stored in the memory being accessible by a plurality of application programs that include at least a game;
    advance the game on the basis of an input from said input device; and
    advance the game by using the measured step counts during execution of the game, said game being advanceable independently from the measured step counts.

2. The game apparatus according to claim 1, wherein
    said step counts in said game are used on the basis of an input from said input device, and
    game processing for advancing the game is executed on the basis of an input from said input device when said step counts are not used, and support processing for advancement of said game in addition to said game processing is executed when said step counts are used.

3. The game apparatus according to claim 1, wherein
    information being a hint for advancement of said game is output when said step counts are used.

4. The game apparatus according to claim 1, wherein
    processing of shortening a time required for advancing said game is executed when said step counts are used.

5. The game apparatus according to claim 1, wherein the apparatus is further configured to:
    convert the measured step counts into a step count correlation value correlating with said step counts and accumulate the step count correlation value; and
    utilize said accumulated step count correlation value.

6. The game apparatus according to claim 5, wherein the apparatus is further configured to:
    utilize said step count correlation value in said game in a case that said step count correlation value is equal to or more than a predetermined value; and
    perform a subtraction on said step count correlation value when said step count correlation value is utilized in said game.

7. The game apparatus according to claim 1, wherein the apparatus is further configured to:
    switch between an unused state and a used state of said game apparatus;
    determine whether or not said used state switches to said unused state; and
    measure step counts when a shift to said unused state is determined.

8. The game apparatus according to claim 7, wherein the apparatus is further configured to:
    switch between a power saving mode and a normal mode; and
    determine whether or not said used state shifts to said unused state by determining whether or not said normal mode shifts to said power saving mode.

9. The game apparatus according to claim 7, wherein the apparatus is further configured to:
    disable said advancement of said game; and
    switch from said used state to said unused state when said advancement of said game is disabled.

10. The game apparatus according to claim 7, wherein
    a game apparatus body has an openable and closeable mechanism, the apparatus is further configured to:
    switch between a closed state and an opened state of said game apparatus body, and
    determine whether or not said used state shifts to said unused state by determining whether or not said game apparatus body shifts from the opened state to the closed state.

11. The game apparatus according to claim 1, further comprising:
    a communication device, wherein
    said communication device automatically executes communication processing while step counts are measured.

12. The game apparatus according to claim 11, wherein
    said communication device automatically makes a search for another game apparatus, and automatically transmits and receives data with said other game apparatus when it is searched.

13. The game apparatus according to claim 11, wherein
    said communication device automatically makes a search for an access point, and automatically transmits and receives data via said access point when it is searched.

14. A game apparatus comprising an input device, the apparatus configured to at least:
    acquire steps counts counted using a motion detection device;
    store the measured step counts in a memory, the step counts stored in the memory being accessible by a plurality of application programs that include at least a game;
    advance the game on the basis of an input from said input device; and
    advance the game by using the acquired step counts during execution of the game, said game being advanceable independently from the acquired step counts.

15. A non-transitory storage medium comprising a game program of a game apparatus having an input device, said game program causes a computer of said game apparatus to:
    measure step counts using a motion detection device;
    store the measured step counts in a memory, the step counts stored in the memory being accessible by a plurality of application programs that include at least a game;
    advance the game on the basis of an input from said input device; and
    advance the game by using the measured step counts during execution of the game, said game being advanceable independently from the measured step counts.

16. A non-transitory storage medium comprising a game program of a game apparatus having an input device, said game program causes a computer of said game apparatus to:
- acquire steps counts counted using a motion detection device;
- store the measured step counts in a memory, the step counts stored in the memory being accessible by a plurality of application programs that include at least a game;
- advance the game on the basis of an input from said input device; and
- advance the game by using the acquired step counts during execution of the game, said game being advanceable independently from the acquired step counts.

17. A game controlling method of a game apparatus having an input device, the method comprising:
- measuring step counts using a motion detection device;
- storing the measured step counts in a memory, the step counts stored in the memory being accessible by a plurality of application programs that include at least a game;
- advancing the game on the basis of the input from said input device; and
- advancing the game by using the measured step counts during execution of the game, said game being advanceable independently from the measured step counts.

18. A game controlling method of a game apparatus having an input device, the method comprising:
- acquiring step counts counted using a motion detection device;
- storing the measured step counts in a memory, the step counts stored in the memory being accessible by a plurality of application programs that include at least a game;
- advancing the game on the basis of the input from said input device; and
- advancing the game by using the acquired step counts during execution of the game, said game being advanceable independently from the acquired step counts.

19. A game system having an input device, the system comprising:
- a processing system having at least one processor, the processing system configured to at least:
  - measure step counts using a motion detection device;
  - store the measured step counts in a memory, the step counts stored in the memory being accessible by a plurality of application programs that include at least a game;
  - advance the game on the basis of an input from said input device; and
  - advance the game by using the measured step counts during execution of the game, said game being advanceable independently from the measured step counts.

20. A game system comprising:
- a game apparatus having an input device and a pedometer counting step counts, said game apparatus configured to at least:
  - acquire steps counts counted using the pedometer;
  - store the measured step counts in a memory, the step counts stored in the memory being accessible by a plurality of application programs that include at least a game;
  - advance the game on the basis of an input from said input device; and
  - advance the game by using the acquired step counts during execution of the game, said game being advanceable independently from the acquired step counts.

21. The game apparatus according to claim 1, wherein advancing the game comprises at least one of providing a hint to supplement progress of the game, supporting development of one or more features of a game character, allowing one or more items to be purchased, and/or allowing one or more courses to be accessible.

22. The game apparatus according to claim 1, wherein the game apparatus is configured to measure step count data using the motion detection device when the apparatus is in a low power or standby mode.

23. The game apparatus according to claim 1, wherein the step count data is accessible by a plurality of game programs and the game programs can utilize the step count data to supplement advancement of the game programs.

24. The game apparatus according to claim 1, wherein the measured step counts stored in the memory are represented as a first value and the game is advanceable using the first value representative of the measured step counts stored in the memory.

* * * * *